US008320328B2

(12) United States Patent
Attar et al.

(10) Patent No.: US 8,320,328 B2
(45) Date of Patent: Nov. 27, 2012

(54) CHANNEL DEPENDENT CREDIT ACCUMULATION FOR MOBILE HANDOVER

(75) Inventors: Rashid Ahmed Akbar Attar, San Diego, CA (US); Durga Prasad Malladi, San Diego, CA (US); Aleksandar Damnjanovic, Del Mar, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1037 days.

(21) Appl. No.: 12/050,746

(22) Filed: Mar. 18, 2008

(65) Prior Publication Data

US 2009/0010224 A1 Jan. 8, 2009

Related U.S. Application Data

(60) Provisional application No. 60/895,678, filed on Mar. 19, 2007.

(51) Int. Cl.
*H04W 4/00* (2009.01)

(52) U.S. Cl. ........................................ 370/331; 370/338

(58) Field of Classification Search .................. 370/331, 370/332, 334, 338, 329, 322, 326, 328, 276, 370/277, 335, 336, 341, 343, 348, 349, 401; 455/67.11, 441, 450, 415
See application file for complete search history.

(56) References Cited

U.S. PATENT DOCUMENTS

| | | | |
|---|---|---|---|
| 5,805,995 A | 9/1998 | Jiang et al. | |
| 7,392,014 B2 * | 6/2008 | Baker et al. | 455/67.11 |

FOREIGN PATENT DOCUMENTS

| | | |
|---|---|---|
| CN | 1784077 A | 6/2006 |
| EP | 1796414 | 6/2007 |
| GB | 2301733 | 12/1996 |
| JP | 2002530956 A | 9/2002 |
| JP | 2002538696 A | 11/2002 |
| JP | 2005020458 A | 1/2005 |
| JP | 2006211645 A | 8/2006 |
| JP | 2007053437 A | 3/2007 |
| WO | 9526593 | 10/1995 |
| WO | 03094544 | 11/2003 |

OTHER PUBLICATIONS

International Search Report—PCT/US08/057561, International Search Authority—European Patent Office—Aug. 6, 2008.
Written Opinion—PCT/US08/057561, International Search Authority—European Patent Office—Aug. 6, 2008.
Taiwan Search Report—TW097109781—TIPO—Aug. 17, 2011.

\* cited by examiner

*Primary Examiner* — Chi Pham
*Assistant Examiner* — Alexander Boakye
(74) *Attorney, Agent, or Firm* — Steven A. Raney

(57) ABSTRACT

Channel dependent credit accumulation for determining a mobile handover is provided herein. In some aspects, a characteristic(s) of a source channel(s) serving a mobile device and of one or more target channels can be evaluated. Magnitudes of the evaluated characteristics can be utilized to generate handover credits associated with the target channel(s) (e.g., based on some function of a difference in the magnitudes). If a concurrent number of credits associated with a target channel equals or rises above one or more threshold levels, a mobile device can initiate a handover. As described, disparity in source and target channel quality, signal strength, etc., can be determined to increase probability of a handover based on channel degradation over one or more time intervals.

49 Claims, 14 Drawing Sheets

CHANNEL DEPENDENT CREDIT ACCUMULATION FOR MOBILE HANDOVER

CROSS REFERENCE TO RELATED APPLICATIONS

The present Non-provisional Application for patent claims priority to Provisional Patent Application No. 60/895,678 filed on Mar. 19, 2007 and entitled CHANNEL DEPENDENT CREDIT ACCUMULATION FOR HANDOVER ALGORITHMS, assigned to the assignee hereof and hereby expressly incorporated by reference herein.

BACKGROUND

I. Field

The following relates generally to wireless communication, and more specifically to providing channel dependent credit accumulation for implementing a handover in a mobile communication environment.

II. Background

Wireless communication systems are widely deployed to provide various types of communication content such as, e.g., voice content, data content, and so on. Typical wireless communication systems can be multiple-access systems capable of supporting communication with multiple users by sharing available system resources (e.g., bandwidth, transmit power). Examples of such multiple-access systems can include code division multiple access (CDMA) systems, time division multiple access (TDMA) systems, frequency division multiple access (FDMA) systems, orthogonal frequency division multiple access (OFDMA) systems, and the like.

Generally, wireless multiple-access communication systems can simultaneously support communication for multiple mobile devices. Each mobile device can communicate with one or more base stations via transmissions on forward and reverse links. The forward link (or downlink) refers to the communication link from base stations to mobile devices, and the reverse link (or uplink) refers to die communication link from mobile devices to base stations. Further, communications between mobile devices and base stations can be established via single-input single-output (SISO) systems, multiple-input single-output (MISO) systems, multiple-input multiple-output (MIMO) systems, and so forth.

MIMO systems commonly employ multiple ($N_T$) transmit antennas and multiple ($N_R$) receive antennas for data transmission. A MIMO channel formed by the $N_T$ transmit and $N_R$ receive antennas can be decomposed into $N_S$ independent channels, which can be referred to as spatial channels, where $N_S \leq \{N_T, N_R\}$. Each of the $N_S$ independent channels corresponds to a dimension. Moreover, MIMO systems can provide improved performance (e.g., increased spectral efficiency, higher throughput and/or greater reliability) if additional dimensionalities created by the multiple transmit and receive antennas are utilized.

In addition to the foregoing, multi-channel communication capabilities can increase availability of beneficial inter-cell or intra-cell mobile handovers. Typically, as a number of available transmit and/or receive antennas increases, opportunities to obtain a higher quality wireless channel via handover can increase as well. For instance, if a mobile device is in range of several such channels, active content can be transferred from a first channel to a second channel. Transfer of active content, or a handover, can typically occur if one available channel is determined to be superior to a current channel.

SUMMARY

The following presents a simplified summary of one or more aspects in order to provide a basic understanding of such aspects. This summary is not all extensive overview of all contemplated aspects, and is intended to neither identify key or critical elements of all aspects nor delineate the scope of any or all aspects. Its sole purpose is to present some concepts of one or mole aspects in a simplified form as a prelude to the more detailed description that is presented later.

In accordance with one or more aspects of the claimed subject matter and corresponding disclosure thereof the subject disclosure provides for channel dependent credit accumulation for determining a mobile handover. A characteristic of a source wireless channel(s) and one or more target wireless channels can be evaluated. A magnitude of the evaluated characteristic can be utilized to increase or decrease handover credits associated with the target channel(s). In some aspects, a function can be employed (e.g., linear function, quadratic function, step function) to determine a number of handover credits to be added or subtracted based on a disparity in determined channel magnitudes. If a concurrent number of handover credits associated with a target channel equals or rises above one or more threshold levels, a mobile device can initiate a handover from the source channel(s) to the target channel(s). Once a handover is conducted, handover credits can be erased and analysis of source/target channels and accumulation of handover credits can be re-initiated.

According to at least one aspect, disclosed is a method of conducting a mobile device handover in a wireless communication environment. The method can comprise obtaining a first determination pertaining to a characteristic of a wireless channel, wherein the wireless channel provides connectivity for a mobile device, and obtaining a second determination pertaining to the characteristic of one or more additional wireless channels. Furthermore, the method can comprise implementing a handover for the mobile device based at least in part on a difference in magnitude between the first determination and the second determination.

In some aspects, provided is an apparatus that conducts a handover for a mobile device in a wireless environment. The apparatus can comprise a transceiver that communicatively couples the mobile device to at least one wireless transmitter via a wireless channel. Further, the apparatus can comprise memory that stores at least one program module pertinent to facilitating a handover for the mobile device and a processor that executes one or more program modules stored in memory. In addition, the apparatus can comprise a channel evaluation module that obtains a first determination pertaining to a characteristic of the wireless channel and a second determination pertaining to the characteristic of one or more additional wireless channels. Moreover, the apparatus can comprise a handover evaluation module that implements a handover for the mobile device based at least in part on a difference in magnitude between the first determination and the second determination.

According to still other aspects, provided is an apparatus that conducts a handover for a mobile device in a wireless environment. The apparatus can comprise means for obtaining a first determination pertaining to a characteristic of the wireless channel and a second determination pertaining to the characteristic of one or more additional wireless channels, the wireless channel facilitates data exchange between the mobile device and at least one transmitter. Furthermore, the apparatus can comprise means for implementing a handover for the mobile device based at least in part on a difference in magnitude between the first determination and the second determination.

In accordance with at least one aspect, disclosed is a processor that conducts a handover for a mobile device in a wireless environment. The processor can comprise a first module configured to obtain a first determination pertaining to a characteristic of a wireless channel and a second determination pertaining to the characteristic of one or more additional wireless channels, the wireless channel facilitates data exchange between the mobile device and at least one transmitter. Furthermore, the processor can comprise a second module configured to implement a handover for the mobile device based at least in part on a difference in magnitude between the first determination and the second determination.

In still other aspects, provided is a computer-readable medium comprising computer-readable instructions configured to conduct a handover for a mobile device in a wireless environment. The instructions can be executable by at least one computer to obtain a first determination pertaining to a characteristic of a wireless channel, wherein the wireless channel facilitates data exchange between the mobile device and at least one transmitter. The instructions can be further executable by the at least one computer to obtain a second determination pertaining to the characteristic of one or more additional wireless channels and to implement a handover for the mobile device based at least in part on a difference in magnitude between the first determination and the second determination.

According to one or more other aspects, disclosed is a method of facilitating a handover for a mobile device in a wireless environment. The method can comprise conducting a first evaluation pertaining to a characteristic of a wireless channel, the wireless channel provides data exchange between a mobile device and a wireless transmitter. Furthermore, the method can comprise receiving information that identifies at least one additional wireless channel communicatively coupled with the mobile device and conducting or receiving a second evaluation pertaining to the characteristic of the at least one additional wireless channel. In still other aspects, the method can comprise forwarding at least the first and second evaluations to the mobile device to facilitate implementing a handover based at least in part on a difference in magnitude of the first and second evaluations.

According to still other aspects, provided is an apparatus that facilitates a handover for a mobile device in a wireless environment. The apparatus can comprise a wireless transceiver that communicatively couples to the mobile device by way of a wireless channel. The apparatus can also comprise memory that stores one or more modules pertinent to implementing the handover and a processor that executes the one or more modules in conjunction with implementing the handover. Furthermore, the apparatus can comprise an evaluation module that conducts a first determination pertaining to a characteristic of the wireless channel and conducts or receives a second determination pertaining to the characteristic of at least one additional wireless channel to facilitate implementing a handover based at least in part on a difference in magnitude of the first and second determinations.

In at least one aspect, disclosed is an apparatus that conducts a handover for a mobile device in a wireless environment. The apparatus can comprise means for conducting wireless data exchange with a mobile device by way of a wireless channel and means for receiving information that identifies at least one additional wireless channel communicatively coupled with the mobile device. The apparatus can further comprise means for conducting a first evaluation pertaining to a characteristic of the wireless channel and conducting or receiving a second evaluation pertaining to the characteristic of the at least one additional wireless channel. Furthermore, the apparatus can comprise means for forwarding at least the first and second evaluations to the mobile device to facilitate implementing a handover based at least in part on a difference in magnitude of the first and second evaluations.

According to one or more additional aspects, disclosed is a processor that conducts a handover for a mobile device in a wireless environment. The processor can comprise a first module configured to conduct wireless data exchange with a mobile device by way of a wireless channel and a second module configured to receive information that identifies at least one additional wireless channel communicatively coupled with the mobile device. The processor can further comprise a third module configured to conduct a first evaluation pertaining to a characteristic of the wireless channel and conduct or receive a second evaluation pertaining to the characteristic of the at least one additional wireless channel. Additionally, the processor can comprise a fourth module configured to forward at least the first and second evaluations to the mobile device to facilitate implementing a handover based at least in part on a difference in magnitude of the first and second evaluations.

In accordance with at least one additional aspect, provided is a computer-readable medium comprising computer-readable instructions configured to facilitate a handover for a mobile device in a wireless environment. The instructions can be executable to cause at least one computer to conduct a first evaluation pertaining to a characteristic of a wireless channel, the wireless channel provides data exchange between a mobile device and a wireless transmitter. The instructions can be further executable to cause the at least one computer to receive information that identifies at least one additional wireless channel communicatively coupled with the mobile device and to conduct or receive a second evaluation pertaining to the characteristic of the at least one additional wireless channel. Additionally, the instructions can be executable to cause the at least one computer to forward at least the first and second evaluations to the mobile device to facilitate implementing a handover based at least in part on a difference in magnitude of the first and second evaluations.

To the accomplishment of the foregoing and related ends, the one or more aspects comprise the features hereinafter fully described and particularly pointed out in the claims. The following description and the annexed drawings set forth in detail certain illustrative aspects of the one or more aspects. These aspects are indicative, however, of but a few of the various ways in which the principles of various aspects can be employed and the described aspects are intended to include all such aspects and their equivalents.

DETAILED DESCRIPTION

Figure 1:
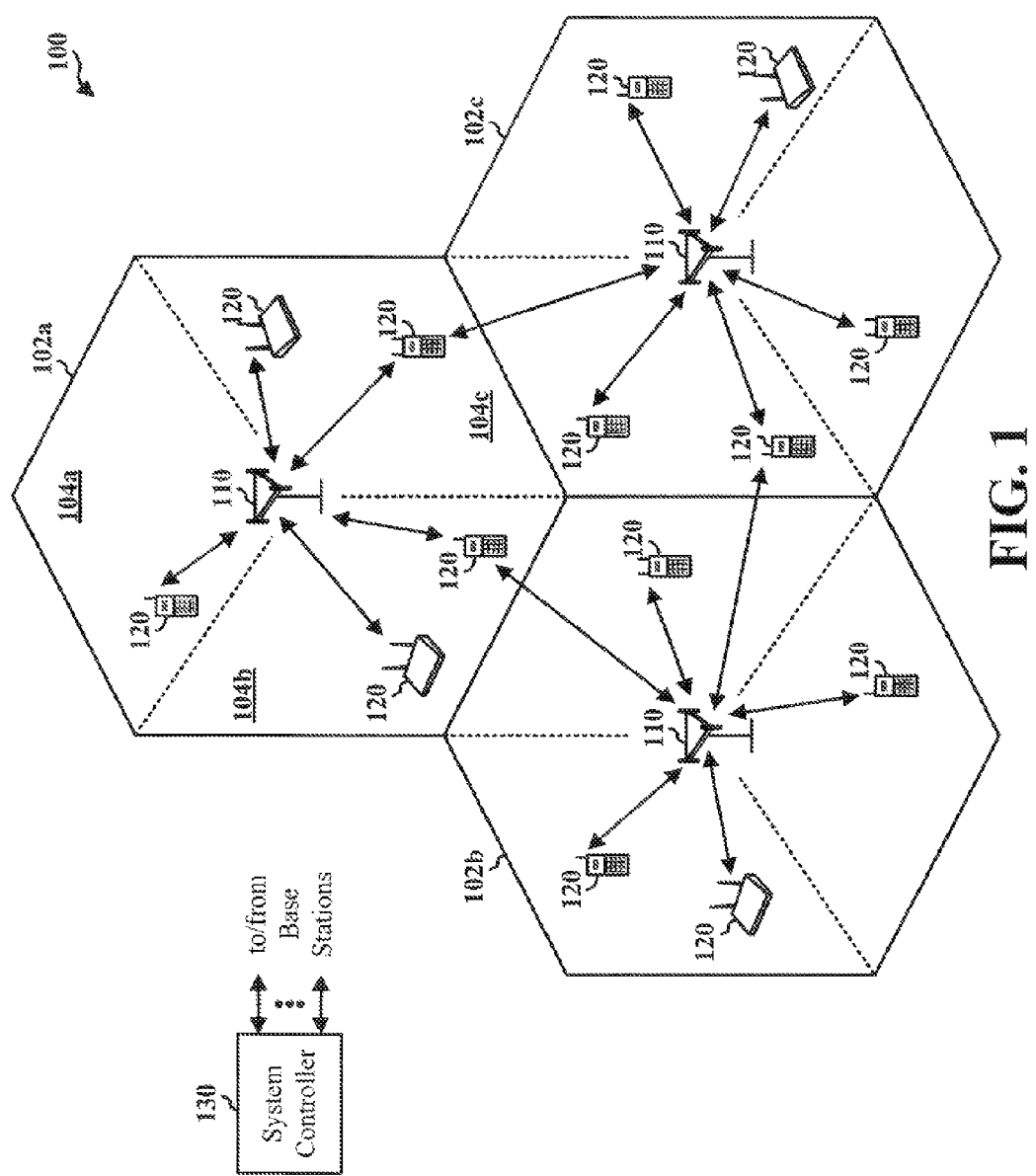
FIG. 1 depicts a block diagram of an example system that provides wireless communication in accordance with aspects set forth herein.

Various aspects are now described with reference to the drawings, wherein like reference numerals are used to refer to like elements throughout. In the following description, for purposes of explanation, numerous specific details are set forth in order to provide a thorough understanding of one or more aspects. It can be evident, however, that such aspect(s) can be practiced without these specific details. In other instances, well-known structures and devices are shown in block diagram form in order to facilitate describing one or more aspects.

In addition, various aspects of the disclosure are described below. It should be apparent that the teaching herein can be embodied in a wide variety of forms and that any specific structure and/or function disclosed herein is merely representative. Based on the teachings herein one skilled in the art should appreciate that an aspect disclosed herein can be implemented independently of any other aspects and that two or more of these aspects can be combined in various ways. For example, an apparatus can be implemented and/or a method practiced using any number of the aspects set forth herein. In addition, an apparatus can be implemented and/or a method practiced using other structure and/or functionality in addition to or other than one or more of the aspects set forth herein. As an example, many of the methods, devices, systems and apparatuses described herein are descried in the context of determining characteristics of one or more wireless channels and providing a handover determination based in part on magnitudes of the determined characteristics. One skilled in the art should appreciate that similar techniques could apply to other communication environments.

The subject disclosure provides for determining whether to conduct a mobile device handover, from a source wireless channel to a target wireless channel, based at least in part on relative values of characteristics associated with such channels. A target wireless channel can be associated with one or more handover credits. A handover credit is a unit of measurement that can compare wireless characteristics of the target channel with similar wireless characteristics of the source channel. For instance, a characteristic(s) of a source channel can be measured. The characteristic can be signal strength, signal quality, signal to noise ratio (SNR), signal to noise interference ratio (SNIR), received power per resource element (RPRE), multipath interference, or a like channel characteristic of a wireless channel, or a combination thereof. A value of the measured characteristic can be compared with a measurement of a corresponding characteristic of one or more target channels. A difference in value between the source measurement and target measurement can determine whether handover credits are added to or subtracted from a pool of handover credits associated with the target channel(s).

According to some aspects, a number of credits can be added or subtracted to a credit pool associated with a channel based on an evaluation of source and target channels. Further, the number of credits can be determined as a function of a difference in magnitude of the target and source channel, evaluations. The function can be any suitable relationship between number of credits and difference in magnitude. As an example, the number of credits can change linearly with changing difference in magnitude. As another example, the number of credits can change quadratically with changing difference in magnitude. As yet another example, the number of credits can change in a quantum fashion (e.g., a step function) with respect to changing difference in magnitude.

A number of credits associated with a difference in magnitude of determined channel characteristics can be added or subtracted to a credit pool associated with a target wireless channel(s). If the target channel characteristic(s) provides better transmission for a mobile device than the source channel, the number of credits can be added to the credit pool. If the target channel characteristic(s) provides poorer transmission for the mobile device than the source channel, the number of credits can be subtracted to the credit pool. In such an arrangement, a higher number of credits can therefore provide a relative indication of transmission capability of the target channel versus the source channel.

A number of credits associated with a target channel pool can be compared with one or more threshold numbers to determine whether actions pertinent to a handover can be triggered, whether the handover can be conducted, and/or what type of handover can be conducted (e.g., mobile initiated, network initiated). For instance, if a number of credits equals or exceeds a primary threshold, a transmission report related to a backward handover (e.g., a report of channel characteristics and/or request for network handover) can be triggered. If the number of credits equals or exceeds a secondary threshold, a forward handover (e.g., a mobile initiated handover) can be conducted. Accordingly, by determining a difference in channel characteristic magnitude, large or small deviations in relative characteristics can be utilized to determine whether a handover and/or actions pursuant to the handover are conducted. Thus, rapid degradation of a source channel characteristic can quickly result in a handover. As described, the subject disclosure provides an improved algorithm for determining mobile handover.

As used in the subject disclosure, the terms "component," "system," and the like are intended to refer to a computer-related entry, either hardware, software, software in execution, firmware, middle ware, microcode, and/or any combination thereof. For example, a component can be, but is not limited to being, a process running on a processor, a processor, an object, an executable, a thread of execution, a program, and/or a computer. One or more components can reside within a process and/or thread of execution and a component can be localized on one computer and/or distributed between two or more computers. Also, these components can execute from various computer readable media having various data structures stored therein. The components can communicate by way of local and/or remote processes such as in accordance with a signal having one or more data packets (e.g., data from one component interacting with another component in a local system, distributed system, and/or across a network such as the Internet with other systems by way of the signal). Additionally, components of systems described herein can be rearranged and/or complemented by additional components in order to facilitate achieving the various aspects, goals, advantages, etc., described with regard thereto, and are not limited to the precise configurations set forth in a given figure, as will be appreciated by one skilled in the art.

Furthermore, various aspects are described herein in connection with a subscriber station. A subscriber station can also be called a system, a subscriber unit, mobile station, mobile, remote station, remote terminal, access terminal, user terminal, user agent, a user device, or user equipment. A subscriber station can be a cellular telephone, a cordless telephone, a Session Initiation Protocol (SIP) phone, a wireless local loop (WLL) station, a personal digital assistant (PDA), a handheld device having wireless connection capability, or other processing device connected to a wireless modem or similar mechanism facilitating wireless communication with a processing device.

Moreover, various aspects or features described herein can be implemented as a method, apparatus, or article of manufacture using standard programming and/or engineering techniques. The term "article of manufacture" as used herein is intended to encompass a computer program accessible from any computer-readable device, carrier, or media. For example, computer-readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory, devices (e.g., card, stick, key drive . . . ). Additionally, various storage media described herein can represent one or more devices and/or other machine-readable media for storing information. The term "machine-readable medium" can include, without being limited to, wireless channels and various other media capable of storing, containing, and/or carrying instruction(s) and/or data.

Moreover, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

As used herein, the terms to "infer" or "inference" refer generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

Referring now to the figures, FIG. 1 illustrates a wireless communication system 100 with multiple base stations 110 and multiple terminals 120, such as can be utilized in conjunction with one or more aspects. A base station is generally a fixed station that communicates with the terminals and can also be called an access point, a Node B, or some other terminology. Each base station 110 provides communication coverage for a particular geographic, area, illustrated as three geographic areas, labeled 102a, 102b, and 102c. The term "cell" can refer to a base station and/or its coverage area depending on the context in which the term is used. To improve system capacity, a base station coverage area can be partitioned into multiple smaller areas (e.g., three smaller areas, according to cell 102a in FIG. 1), 104a, 104b, and 104c. Each smaller area can be served by a respective base transceiver subsystem (BTS). The term "sector" can refer to a BTS and/or its coverage area depending on the context in which the term is used. For a sectorized cell, the BTSs for all sectors of that cell are typically co-located within the base station for the cell. The transmission techniques described herein can be used for a system with sectorized cells as well as a system with un-sectorized cells. For simplicity, in the following description, the term "base station" is used generically for a fixed station that serves a sector as well as a fixed station that serves a cell.

Terminals 120 are typically dispersed throughout the system, and each terminal can be fixed or mobile. A terminal can also be called a mobile station, user equipment, a user device, or some other terminology. A terminal can be a wireless device, a cellular phone, a personal digital assistant (PDA), a wireless modem card, and so on. Each terminal 120 can communicate with zero, one, or multiple base stations on the downlink and uplink at any given moment. The downlink (or forward link) refers to the communication link from the base stations to the terminals, and the uplink (or reverse link) refers to the communication link from the terminals to the base stations.

For a centralized architecture, a system controller 130 couples to base stations 110 and provides coordination and control for base stations 110. For a distributed architecture, base stations 110 can communicate with one another as needed. Data transmission on the forward link occurs from one access point to one access terminal at or near the maximum data rate that can be supported by the forward link and/or the communication system. Additional channels of the forward link (e.g., control channel) can be transmitted from multiple access points to one access terminal. Reverse link data communication can occur from one access terminal to one or more access points.

Figure 2:
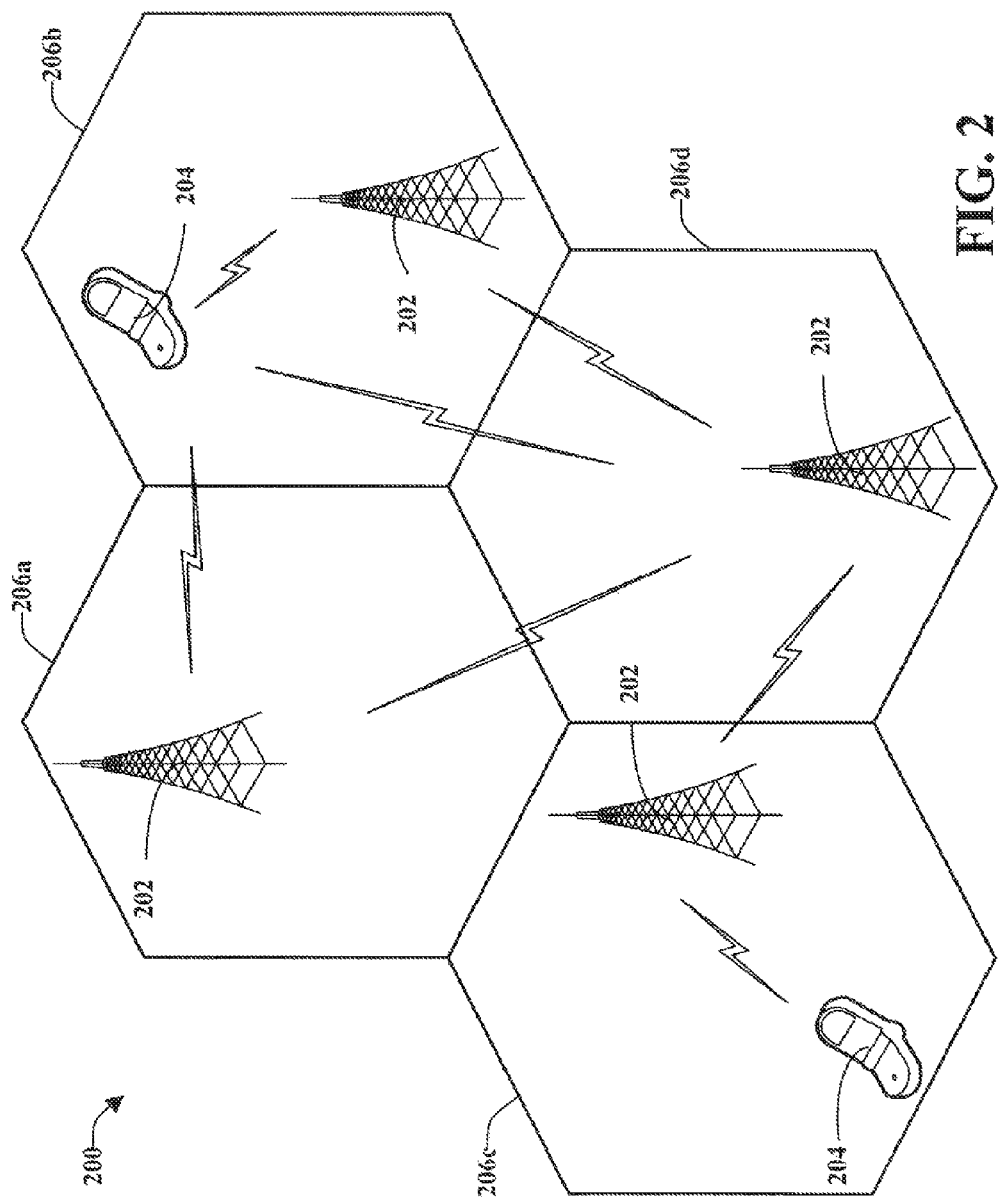
FIG. 2 illustrates a block diagram of an example communications apparatus for employment with a wireless communication environment.

FIG. 2 is an illustration of an ad hoc or unplanned/semi-planned wireless communication environment 200, in accordance with various aspects. System 200 can comprise one or more base stations 202 in one or more sectors that receive, transmit, repeat, etc., wireless communication signals to each other and/or to one or more mobile devices 204. As illustrated, each base station 202 can provide communication coverage for a particular geographic area, illustrated as four geographic areas, labeled 206a, 206b, 206c and 206d. Each base station 202 can comprise a transmitter chain and a receiver chain, each of which can in turn comprise a plurality of components associated with signal transmission and reception (e.g., processors, modulators, multiplexers, demodulators, demultiplexers, antennas, and so forth), as will be appreciated by one skilled in the art. Mobile devices 204 can be, for example, cellular phones, smart phones, laptops, handheld communication devices, handheld computing devices, satellite radios, global positioning systems, PDAs, and/or any other suitable device for communicating over wireless network 200. System 200 can be employed in conjunction with various aspects described herein in order to facilitate determining wireless channel characteristics and/or determining mobile handover based on differences in such determined characteristics, as set forth with regard to subsequent figures.

Figure 3:
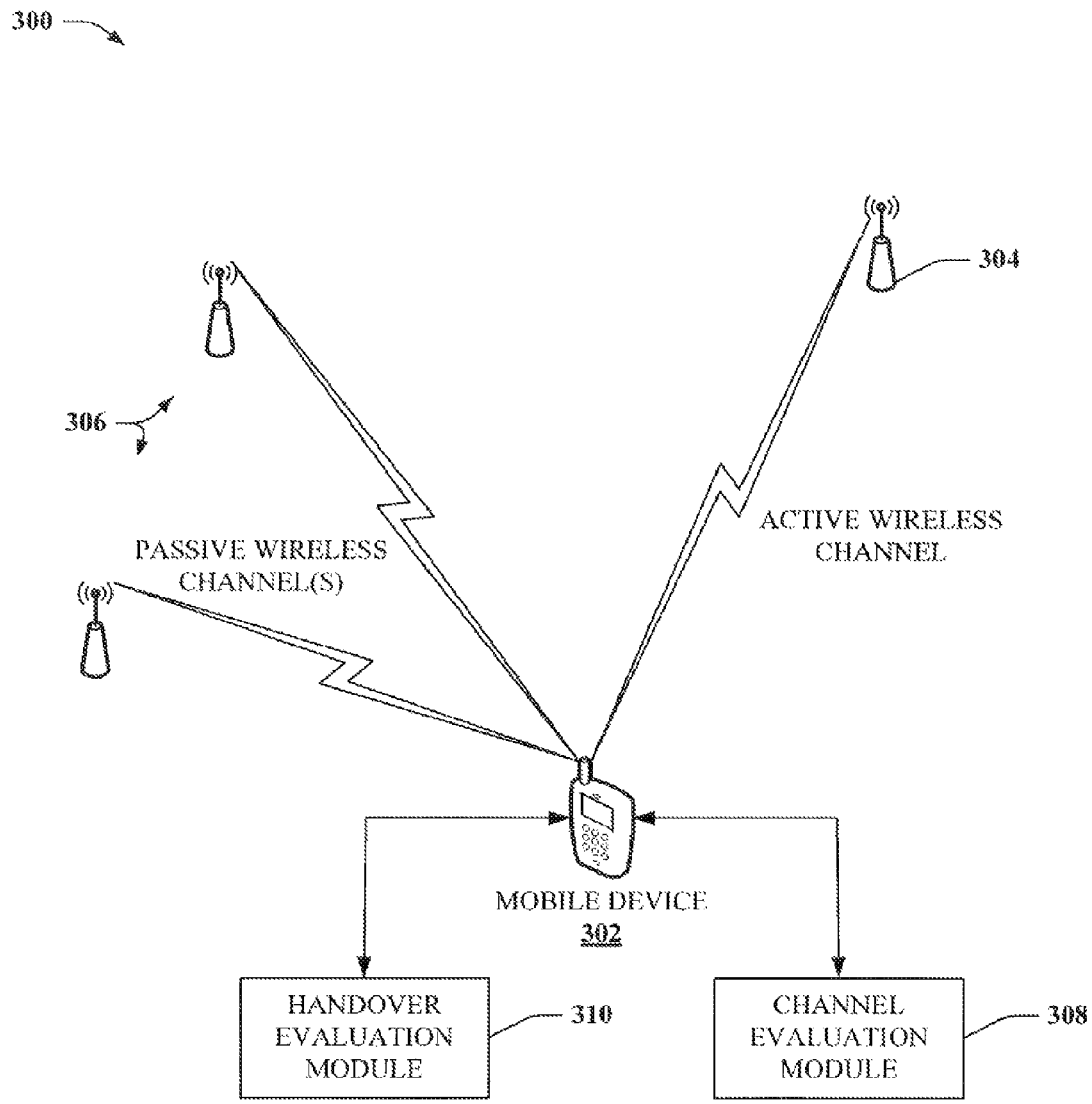
FIG. 3 depicts a block diagram of an example system that provides channel dependent handover determinations according to at least one aspect set forth herein.

FIG. 3 depicts a block diagram of an example system 300 that provides channel dependent handover determinations according to at least one aspect set forth herein. System 300 can include a mobile device 302 communicatively coupled with one or more wireless transmitters (e.g., base stations) by way of one or more wireless channels. An active base station 304 provides data throughput for mobile device 302. For instance, voice content, data content, and/or the like can be passed to and from the mobile device 302 by way of an active wireless channel with the active base station 304. In addition, mobile device 302 can be communicatively coupled to one or more passive base stations 306 by way of one or more passive wireless channels. The passive wireless channels can provide system-related data exchange, such as channel quality information, but typically do not provide active content data exchange (e.g., voice traffic, application data traffic, etc.).

System 300 can further include a channel evaluation module 308 coupled with mobile device 302. According to at least one aspect, the channel evaluation module 308 can obtain a first determination (e.g., from the active base station 304) pertaining to a characteristic of an active wireless channel (e.g., coupling the mobile device 302 with the active base station 304). Further, the channel evaluation module 308 can obtain a second determination pertaining to the same or similar characteristic of one or more additional wireless channels. The additional wireless channels can communicatively couple the mobile device 302 with the passive base stations 306, at least in regard to wireless system information.

In one non-limiting example, the channel evaluation module 308 can obtain an evaluation of channel quality. For instance, the channel quality determination can provide a measurement of strength and/or clarity of data transmission of a particular wireless channel, measure in decibels (dB). In such an example, therefore, channel evaluation module 308 can obtain a first channel quality determination related to an active wireless channel associated with active base station 304 measured in dB. Further, the channel evaluation module 308 can obtain a second channel quality determination related to a passive wireless channel(s) associated with one or more passive or target base stations 306, also measured in dB.

In addition to the foregoing, system 300 can include a handover evaluation module 310 can implement a handover for mobile device 302 based at least in part on a difference in magnitude between the first determination and the second determination. For instance, if a first determination indicates a channel quality of 10 dB for an active channel, and a second determination indicates a channel quality of 4 dB for one or more passive or target channels, the difference in magnitude, 6 dB, can be associated with a handover determination.

Accordingly, rapid degradation or improvement in channel quality over one or more observation intervals (e.g., a period of time utilized to measure a characteristic of a channel) can be identified by system 300 and utilized in determining whether or not to conduct the handover. Thus, for instance, if a passive wireless channel becomes increasingly preferable to an active channel over the observation interval(s), the handover can be conducted. Alternatively, if the active wireless channel becomes increasingly preferable to the passive channel, or a difference in magnitude between channel quality determinations falls below a minimum threshold, the handover can be foregone. Therefore system 100 is not limited to simplistic determinations of which channel is better over an observation interval. Rather, system 100 can determine and utilize a degree of difference in channel characteristics instead.

Figure 4:
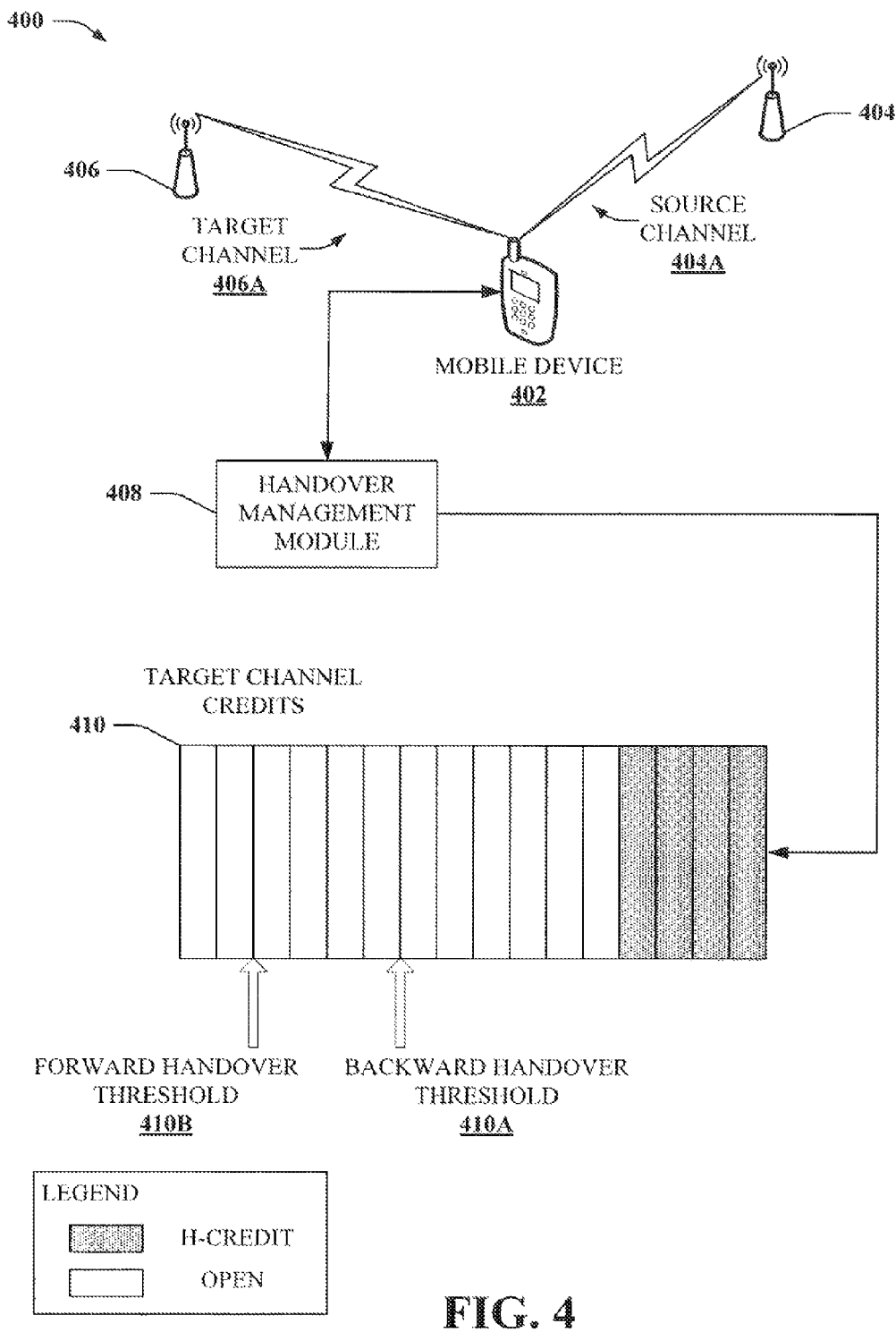
FIG. 4 illustrates a block diagram of a sample system that provides a channel dependent handover determination in accordance with at least one aspect.

FIG. 4 illustrates a block diagram of a sample system 400 that provides a channel dependent handover determination in accordance with at least one aspect. System 400 includes a mobile device 402 communicatively coupled with a source, or active, base station 404 by way of a source channel 404A. Additionally, mobile device 402 is communicatively coupled with a target, or passive, base station 406 by way of a target channel 406A. Mobile device 402 can further be associated with a handover management component 408 that can update a number of handover credits of at least one or more target wireless channels 406A based on a function of a difference in magnitude of channel quality characteristics. Accordingly, system 400 provides a mechanism to gauge whether to conduct a handover based at least in part on such difference in channel quality magnitude.

Handover management component 408 can update a pool of handover credits 410 associated with one or more target channels 406A based on a characteristic of the target channel (s) 406A and a source channel 404A. In at least one aspect, the channel characteristic can comprise a channel quality indicator, such as received signal strength, SNR, SNIR, RPRE, or the like. Active base station 404 and/or mobile device 402 can evaluate the characteristic of the active channel 404A over a period of time, or observation interval. The evaluation can produce a measurement of the characteristic of the active channel, where the measurement has at least a magnitude (e.g., 10 dB), over the period of time. Furthermore, passive base, station 406 and/or mobile device 402 can evaluate the characteristic of the target channel(s) 406A over the period of time, or a similar period of time (e.g., the same period of time, a similar period of time having a same duration, such as a period that is offset in time a small degree compared with the duration, etc.). The evaluation of the target channel(s) 406A can also include at least a magnitude (e.g., 15 dB) over the period of time or similar period of time.

Once channel characteristic evaluations are performed or received at mobile device 402, magnitudes of the evaluations are compared. If the target channel evaluation (s) is preferable (e.g., greater signal strength) to the source channel evaluation, optionally plus a differential factor, handover management component 408 can add a number of handover credits to a handover credit pool 410 associated with the target channel (s) 406A. If the source channel evaluation is preferable to the target channel evaluation (s), handover management component 408 can subtract a number handover credits from the handover credit pool 410. The number of credits added to or subtracted from the handover credit pool 410 can be a function of at least the difference in magnitude of the source and target evaluations.

As a non-limiting example of the foregoing, if target channel evaluation is preferable to the source channel evaluation, target/source channel disparity (difference in magnitude) can be determined based on the difference in the target evaluation and in the source evaluation plus a differential factor. An equation of the following form can determine the disparity:

$$\Delta_1 = T_{CH} - (S_{CH} + \text{DIFF})$$

where $\Delta_1$ is the channel disparity when the target channel(s) is stronger or otherwise preferable to the source channel, $T_{CH}$ is the target channel(s) evaluation magnitude (e.g., signal strength, quality, SNR, SNIR, RPRE, etc.), $S_{CH}$ is the source channel evaluation magnitude (e.g., signal strength, quality, SNIR, ORE, etc.), and DIFF is a minimum offset value (e.g., substantially 1 dB to 3 dB). Further to the above, if source channel evaluation is preferable to the target channel evaluation (s), disparity can be determined by an equation of the following form:

$$\Delta_2 = S_{CH} - (T_{CH} + \text{DIFF})$$

where $\Delta_2$ is the channel disparity when the source channel is stronger or otherwise preferable to the target channel(s).

Once channel disparity $\Delta_1$ or $\Delta_2$ is determined, a number of handover credits added or subtracted to the handover pool 410 can be determined. In one aspect, the handover credits are determined as a function of disparity $\Delta_1$ or $\Delta_2$. For instance, a number of credits can be determined linearly with changing disparity, quadratically with changing disparity, in various quantized units as disparity changes, and so on it should be appreciated that any suitable function can be employed, as described herein, to determine the number of credits.

In addition to the foregoing, a handover can be conducted by mobile device 402 based on an accumulated number of credits in comparison with a handover threshold 410A, 410B. If a number of credits in the target channel(s) credit pool 410 exceeds a primary threshold 410A (e.g., backward handover threshold), mobile device 402 can trigger a measurement report pertinent to the active channel or target channel(s). Specifically, a report of source and/or target channel characteristics can be generated and output to a mobile network via base stations (404, 406) coupled with the mobile device 402. In some aspects, a request for a handover (e.g., a backward, or network-initiated, handover) from the source channel 404A to one or more target channels 406A can accompany the report. In addition to the foregoing, if a number of credits exceeds a secondary threshold 410B (e.g., forward handover threshold), mobile device 402 can conduct a forward handover. For instance, mobile device 402 can terminate an active connection with source channel 404A and activate a connection with one or more target channels 406A. In some aspects, the secondary threshold 410B is associated with a greater number of handover credits than the primary threshold 410A.

As described, system 400 can provide a handover determination based on contemporaneous strength, quality or like characteristic of source and target wireless channels (404A, 406A). By determining magnitude of change in a characteristic, a rapid degradation in a source channel with respect to target channel can lead to a handover. Likewise, rapid improvement in target channel with respect to the source channel can lead to a handover as well. Accordingly, system 400 can reduce instances of call drops that result from rapid deterioration of a source channel.

Figure 5:
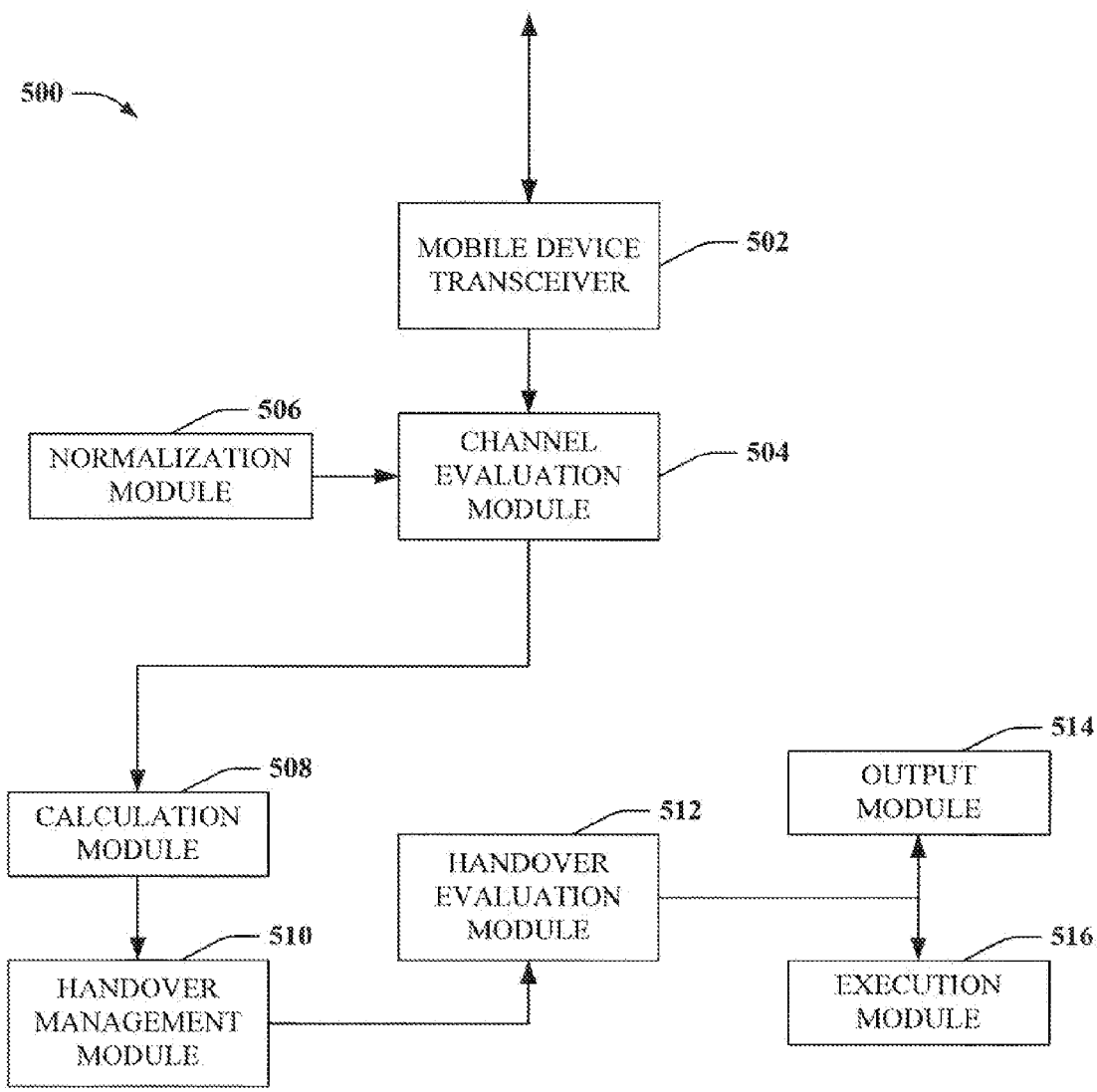
FIG. 5 depicts a block diagram of an example system that evaluates one or more wireless channels in conjunction with implementing a mobile handover.

FIG. 5 depicts a block diagram of an example system 500 that evaluates one or more wireless channels in conjunction with implementing a mobile handover. System 500 can include a mobile device transceiver 502 that can communicatively couple a mobile device (not depicted) to at least one wireless transmitter (e.g., a base station) via a wireless channel. The wireless channel facilitates data exchange between the mobile device and wireless transmitter.

System 500 can further include a channel evaluation module 504. Channel evaluation module 504 obtains one or more determinations pertaining to a characteristic of the wireless channel and/or a target wireless channel(s). Such a characteristic can include, for instance, signal strength, signal quality, interference, channel noise, multi-path or multi-path scatter, SNR, SNIR, RPRE, or a combination thereof or of the like. Channel evaluation module 504 can also include a normalization module 506 that can filter signals pertaining to the wireless channel characteristics, e.g., by employing a channel filtering function. For instance, filtering can comprise a normalization of current and previous channel determinations. In some aspects, the filtering can comprise a weighting factor to gauge relative importance of current and previous determinations. As a particular example, normalization module 506 can employ a 1-tap Infinite Impulse Response (IIR) filter to conduct the channel filtering. According to additional aspects, normalization module 506, can employ an equation of the following form for the 1-tap IIR filter:

$$y(n) = \frac{1}{T_C} \cdot x(n) + \left(1 - \frac{1}{T_C}\right) \cdot y(n-1)$$

where $y(n)$ is a current filtered determination (e.g., a contemporaneous determination of a target channel characteristic, a source channel characteristic, and so on), $y(n-1)$ is a previous filtered source or target channel determination (e.g., obtained and calculated prior to the current filtered source or target determination respectively), $x(n)$ is a current unfiltered source or target determination, and where $$\frac{1}{T_C}$$

is a filtering constant that provides a relative weight for the unfiltered determination and prior filtered determination. As another example, the normalization module 506 can employ a Finite Impulse Response (FIR) filter as the channel filtering function.

Once filtering is complete, if utilized, channel determinations are forwarded by the channel evaluation module 504 to a calculation module 508. Calculation module 508 can evaluate a difference in magnitude of channel characteristic determinations (e.g., filtered or unfiltered). Furthermore, the calculation module 508 can determine a number of handover credits to be added or subtracted from a handover credit pool based on a predetermined function of the difference in magnitude. In at least one aspect, a function of the following form can be employed to determine the number of handover credits:

n=0 for $\Delta$<2 dB n=1 for 2 dB$\leq\Delta\leq$4 dB, n=2 for 4 dB$\leq\Delta\leq$6 dB n=3 for 6 dB$\leq\Delta$<8 dB; and n=4 for 8 dB$\leq\Delta$, where n is a number of handover credits and $\Delta$ is the difference in magnitude. According to at least one further aspect, the difference in magnitude can be determined based on the disparity equations described at FIG. 4, supra. Once a number of handover credits is determined, a handover management module 510 can update a handover credit pool associated with one or more target channels. Specifically, handover management module 510 can increase the number of handover credits of the credit pool if the magnitude of the target channel(s) is greater than the magnitude of the source channel (e.g., substantially 1 to 3 dB greater or more). According to further aspects, handover management module 510 can decrease the number of handover credits of the credit pool if the magnitude of the source channel is greater than the magnitude of the target channel(s) (e.g., substantially 1 to 3 dB greater or more).

System 500 can further include a handover evaluation module 512 that determines whether to implement a handover for a mobile device based at least in part on the difference in magnitude of the target and source channel determinations. In some aspects, the determination(s) can comprise a comparison of handover credits associated with a target channel(s) to one or more thresholds. For instance, if the handover credits exceed a primary threshold, a measurement report associated with the target and source channels can be triggered. The measurement report can include or accompany a request for a backward handover in such case, an output module 514 can initiate the request for the backward handover by generating the measurement report and submitting the report to a mobile network. The report can include the source and/or target channel characteristics, the comparison of the handover credits with the primary thresholds, and so on. As mentioned above, the report can comprise or accompany a request for a network-initiated handover from the source channel to (one of) the target channel(s).

If the number of handover credits exceeds a secondary threshold, a forward handover can be conducted. An execution module 516 can implement the forward handover, causing the mobile device to terminate an active channel and activate a target channel. Accordingly, content services associated with mobile communication are subsequently delivered by way of the target channel rather than the source active source channel. If a handover is conducted, handover management module 510 can reset a number of handover credits associated with the target channel(s) to zero. System 500 can then continue to evaluate the source channel (or, e.g., a target channel which has become a new source channel) and any additional target channels in range of a mobile device.

Figure 6:
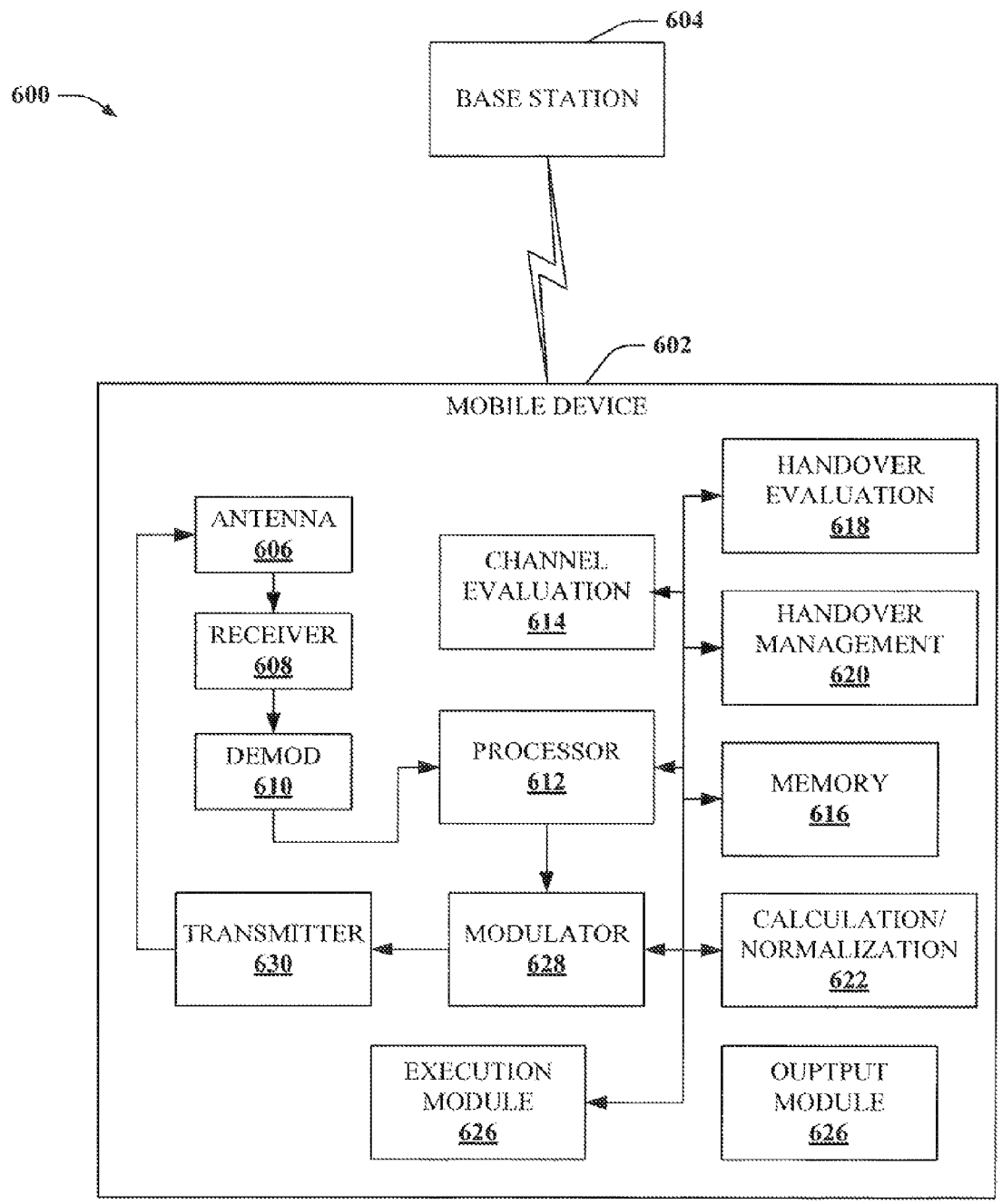
FIG. 6 illustrates a block diagram of an example mobile device that can implement a handover based on characteristics of source and target wireless channels.

FIG. 6 illustrates a block diagram of an example system 600 that comprises a mobile device 602. Mobile device 602 can be configured to implement a handover based on characteristics of source and target wireless channels, as described herein. Accordingly, mobile device 602 can conduct a handover, where appropriate, based on rapid degradation or improvement of source/target channels. Thus, mobile device 600 can facilitate more robust mobile communication, reducing call drop rates in some instances.

Mobile handset 602 includes at least one antenna 606 (e.g. a transmission receiver or group of such receivers comprising an input interface) that receives a signal (e.g., comprising data pertinent to characteristics of one or more wireless channels) and a receiver 608, which performs typical actions (e.g., filters, amplifies, down-converts, etc.) on the received signal. Specifically, antenna 606 and transmitter 630 (collectively referred to as a transceiver) can be configured to facilitate wireless data exchange with base station 604. In one example, antenna 606 can be configured to receive information pertinent to determining a measurement of one or more characteristics of a wireless link between the mobile device 602 and base station 604.

Antenna 606 and receiver 608 can also be coupled with a demodulator 610 that can demodulate received symbols and provide them to a processor 612 for evaluation. Processor 612 can analyze information received by antenna 606 and/or generate information for transmission by a transmitter 630. Additionally, processor 612 can control and/or reference one or more components (606, 608, 610, 614, 616, 618, 620, 622, 624, 626, 628, 630) of the mobile handset 602. Further, processor 612 can execute one or more modules, applications, engines, or the like (620, 622, 624) that comprise information or controls pertinent to executing functions of the mobile device 602. For instance, such functions can include receiving data from a remote source (604), receiving a determination of a characteristic of a wireless channel, comparing the determination to a determined characteristic of another wireless channel, obtaining a difference in magnitude of the characteristics, and determining whether to conduct a handover based at least in part on the difference in magnitude, or the like.

Mobile handset 602 can additionally include memory 616 that is operatively coupled to processor 612. Memory 616 can store data to be transmitted, received, and the like. Further, memory 616 can store one or more program modules (614, 618, 620, 622, 624, 626) pertinent to determining channel characteristics or implementing a handover as described herein.

In at least one aspect, mobile handset 602 can comprise a channel evaluation module 614. The channel evaluation module 614 can obtain (e.g., by calculating or receiving via wireless transmission) evaluated characteristics of one or more wireless channels utilized by the mobile handset 602. The characteristics can be filtered, by a normalization/calculation module 622 for instance, utilizing a weighting function that weights a received signal characteristic against another signal characteristic. In one example, the weighting function can be a 1-tap IIR filter that weights a concurrent signal characteristic against a prior signal characteristic. In another example the weighting function can be a FIR filter.

Furthermore, mobile handset 602 can comprise a handover evaluation module 618. Such module 618 can determine whether a handover from a source wireless channel, providing an active link with base station 604, to a target wireless channel can be conducted. The determination can be made at least in part based on differences in determined characteristics of such wireless channels over one or more observation intervals. In some aspects, the determination can comprise a comparison of handover credits with one or more thresholds. Further, the handover credits can be accumulated based on a disparity in signal quality, strength, or the like, of the target channel relative to the source channel.

In addition to the foregoing, mobile handset 602 can include a handover management module 620. The handover management module 620 can track a pool of handover credits associated with a target wireless channel. The handover credits can provide a measurement of preference of a source wireless channel as compared with one or more target wireless channels. Further, handover management module 620 can update the pool of credits depending on concurrent channel determinations. For instance, if a source channel strength, quality, etc., is worse than a target channel strength, quality, etc., by a predetermined amount (e.g., 1 to 3 dB, or like metric), a number of handover credits can be added to the pool. If the target channel strength, quality, etc., is worse than the source channel, a number of handover credits can be subtracted from the pool. Furthermore, the number of credits can be determined by a function of the difference in magnitude of the strength, quality, etc. A calculation/normalization module 622 can include a function, as described herein, which provides the number of credits based on the determined difference in evaluated channel characteristics. The number of credits can be added or subtracted from the pool of credits associated with a target channel, as described herein.

In addition, mobile handset 602 can include an output module 626 and an execution module 628 to trigger a channel measurement report and conduct a forward handover, respectively. Output module 626 can trigger the measurement report (e.g., in conjunction with a backward handover request) if a number of handover credits associated with a target channel equals or rises above a primary threshold, optionally plus a non-negative offset (e.g., zero to three dB). The measurement report can comprise generating a summary of target and/or source channel characteristics. The measurement report can further comprise a request for a network-initiated transfer from the source channel to the target channel. Execution module 626, on the other hand, can conduct a forward handover if the number of handover credits equals or rises above a secondary threshold. The forward handover can comprise a mobile-initiated activation of the target wireless channel, and termination or deactivation of the previous source wireless channel.

Mobile handset 602 can still further comprise a modulator 628, and a transmitter 630 that transmits generated signals (e.g., by processor 612 and modulator 628) to, for instance, base station 604, an access point, another access terminal, a remote agent, etc. As described, system 600 provides a mobile device 602 that can facilitate conducting a handover based on disparity in target and source channel characteristics. Accordingly, mobile device 602 can reduce a likelihood of a call drop based on rapid degradation of the source channel, at least in an instance where at least one target channel is available to continue exchange of mobile content.

Figure 7:
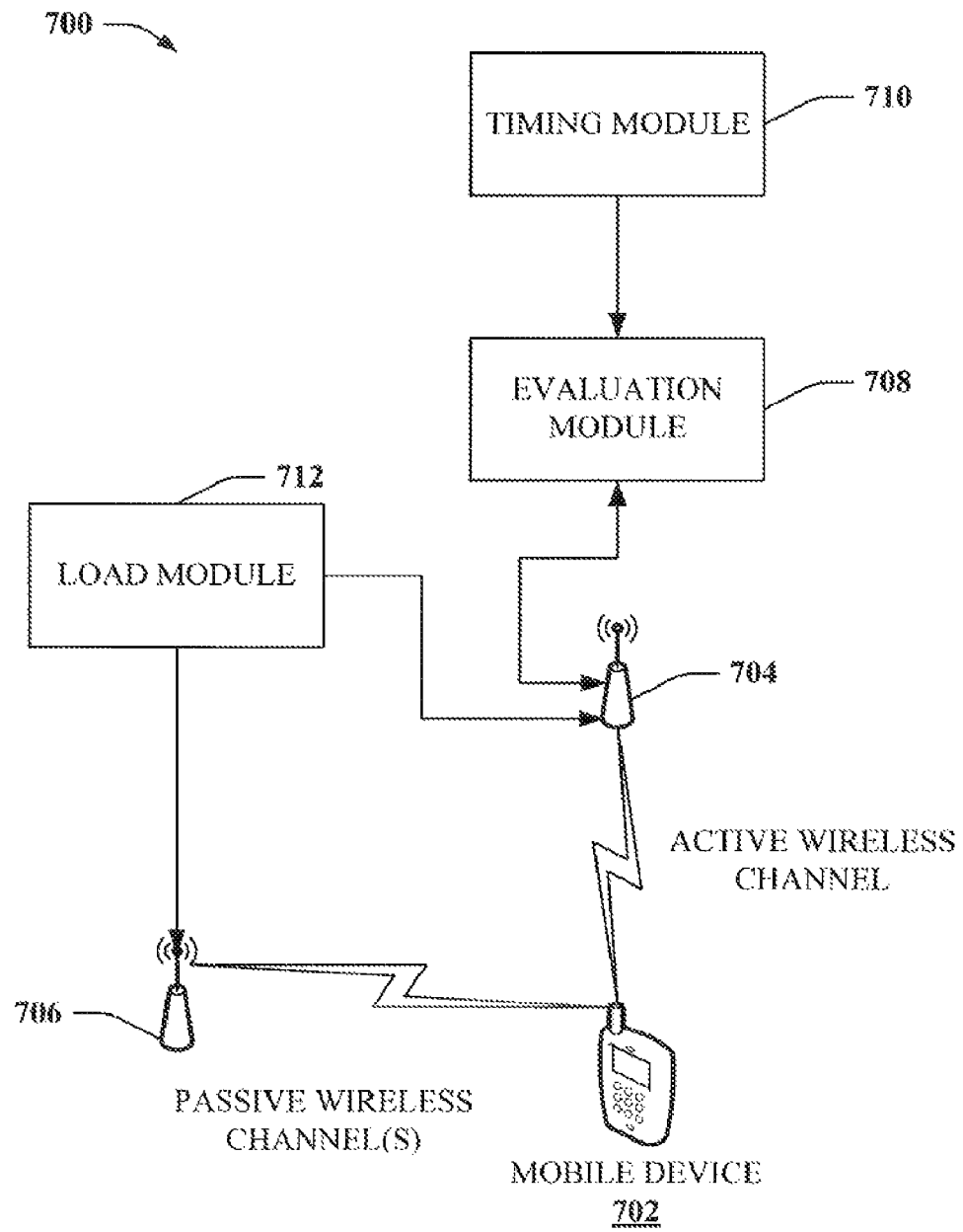
FIG. 7 depicts a block diagram of an example system that can facilitate channel dependent handover according to at least one aspect disclosed herein.

FIG. 7 depicts a block diagram of an example system 700 that can facilitate channel dependent handover according to at least one aspect disclosed herein. System 700 can comprise a base station 704 coupled with a mobile device 702 via an active wireless channel. In addition, system 700 can comprise one or more passive base stations 706 coupled with the mobile device 702 via one or more passive wireless channels. The base station 704 can be associated with an evaluation module 708 that can determine characteristics associated with the active channel and determine or obtain characteristics associated with the passive channel(s). Determined characteristics can be forwarded to mobile device 702 to facilitate determining whether to conduct a handover. Specifically, disparity in channel characteristics can be utilized to determine the handover, as described herein.

In some aspects, the evaluation module 708 can conduct a first determination pertaining to a characteristic of the source channel. Further, the evaluation module can obtain or conduct a second determination pertaining to the characteristic of the target channel(s). The determinations can be over a particular period of time, or observation interval, established by a timing module 710. In some aspects, the observation interval can be a common length of time for the first determination and the second determination. According to still other aspects, the common length of time can be substantially 0.5 milliseconds. In accordance with at least one further aspect, the timing module can conduct the first and second determinations over a common observation interval, wherein the common observation interval can be a common 0.5 millisecond time period.

In addition to the foregoing, source and target channel determinations can facilitate implementing a handover for the mobile device 702. For instance, a difference in signal strength, signal quality, SNR, SNIR, RPRE, or the like, as provided by the first and second determinations, can be utilized by the mobile device 702 to determine whether to implement the handover. In one aspect, downlink signal quality can be employed as the characteristic of the source and target channels. Thus, a difference in downlink signal quality, e.g., measured in dB, can determine at least in part whether the handover should be conducted. In other aspects, the determination can also be based on current load or capacity of the source wireless channel and target wireless channel. For instance, a loading module 712 can determine a capacity of the target channel and/or source channel. The capacity determination can identify whether the target channel has sufficient resources (e.g., bandwidth, available codes in a code division multiple access [CDMA] environment, available tones in an orthogonal frequency division multiplex [OFDM] environment, and so on) to support the mobile device 702. Such capacity information can be forwarded to mobile device 702, or can be utilized in determining whether to implement a network-initiated handover for the mobile device 702.

Figure 8:
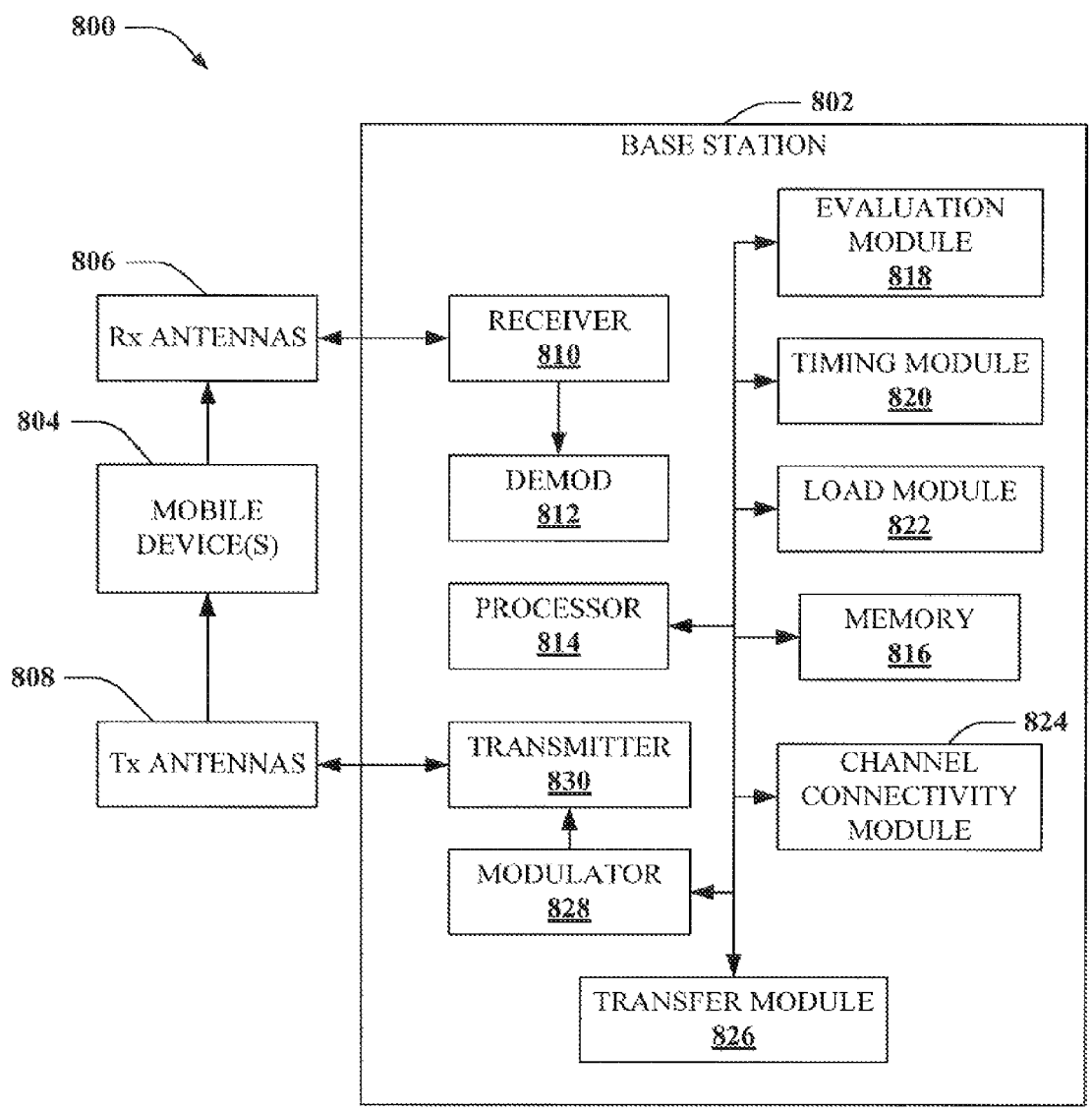
FIG. 8 depicts a block diagram of an example base station that can facilitate a channel dependent handover.

FIG. 8 depicts a block diagram of an example system 800 comprising a sample base station 802 that can facilitate a channel dependent handover. Specifically, a disparity in characteristic of a source channel (e.g., signal quality, signal strength, interference, noise, SNR, SNIR, RPRE, and so on), providing active data exchange for a mobile device 804, and one or more characteristics of a target channel, passively coupled with the mobile device 804, can be identified by base station 802 and forwarded to the mobile device 804. In addition, channel load and capacity can be determined by the base station 802 to further quality whether to conduct the handover. Accordingly, system 800 facilitates improved mobile communication be enabling detection of rapid degradation in source/target channel relative characteristics, and implementing a handover based at least in part thereon.

System 800 comprises a base station 802 (e.g., access point, . . . ) with a receiver 810 that receives signal(s) from one or more mobile devices 804 through a plurality of receive antennas 806, and a transmitter 830 that transmits to the one or more mobile devices 804 through a transmit antenna(s) 808. Receiver 810 can receive information from receive antennas 806 and can further comprise a signal recipient (not shown) that receives uplink data scheduled in accordance with a transmission allocation period provided by base station 802. Additionally, receiver 810 is operatively associated with a demodulator 812 that demodulates received information. Demodulated symbols are analyzed by a processor 814 that is coupled to a memory 816 that stores information related to determining or obtaining channel characteristics of one or more wireless channels coupled with mobile device(s) 804, forwarding such characteristics to the mobile device(s) 804 for analysis, receiving a request to conduct a network-initiated handover, determining load and/or capacity of one or more target wireless channels, conducting a network-initiated handover for the mobile device(s) 804, and/or any other suitable information related to performing the various actions and functions set forth herein.

Processor 814 is further coupled to an evaluation module 818 that can conduct or obtain determinations of characteristics of wireless channels associated with the mobile device(s) 804. For instance, evaluation module 818 can determine signal strength associated with an active channel in dB. Further, the evaluation module 818 can determine or obtain signal strength of a target channel in dB. The determined/obtained signal strength values can be forwarded to the mobile device (s) 804 via the active channel.

Processor 814 can be further coupled to a timing module 820 that can set an observation interval for one or more signal determinations, as described herein. Additionally, the processor 814 can be coupled to a channel connectivity module 824 that can receive from the mobile device(s) 804 a connectivity report associated with a backward handover. The connectivity report is initiated by the mobile device(s) 804 based on difference in magnitude of one or more source and target channel determinations. As a specific example, the backward handover can result from accumulation of target channel handover credits equal to or above a primary threshold (e.g., associated with initiating the connectivity report), optionally plus a non-negative threshold.

In addition to the foregoing, processor 814 can be associated with a loading module 822. Loading module 822 can determine capacity of base station 802 and at least one target wireless channel. The relative capacities can be utilized in conjunction with a network-initiated handover. For instance, a base station transfer module 826 can implement such a handover for the mobile device(s) 804 from an active wireless channel, coupling the mobile device(s) 804 with base station 802, to a passive wireless channel, coupling the mobile device (s) 804 with one or more other base stations (not depicted). More specifically, the handover from the active to passive wireless channel can be implemented based at least in part on the base station capacities determined by loading module 822, and/or the difference in channel characteristic magnitudes.

The aforementioned systems have been described with respect to interaction between several components, modules and/or electronic interface functions. It should be appreciated that such systems and components/modules/functions can include those components or sub-components specified therein, some of the specified components or sub-components, and/or additional components. For example, a system could include mobile device 302, active base station 304, channel evaluation module 308, handover management module 408, and calculation module 508, or a different combination of these and/or other components. Sub-components could also be implemented as components communicatively coupled to other components rather than included within parent components. Additionally, it should be noted that one or more components could be combined into a single component providing aggregate functionality. For instance, calculation module 508 can include normalization module 506, or vice versa, to facilitate providing a filtering function to weight incoming data and providing a functional relationship between number of handover credits and difference in channel characteristic(s) magnitude by way of a single component. The components can also interact with one or more other components not specifically described herein but known by those of skill in the art.

Furthermore, various portions of the disclosed systems can include or consist of artificial intelligence or knowledge or rule based components, sub-components, processes, means, methodologies, or mechanisms (e.g., support vector machines, neural networks, expert systems, Bayesian belief networks, fuzzy logic, data fusion engines, classifiers . . . ). Such components, inter alia, and in addition to that already described herein, can automate certain mechanisms or processes performed thereby to make portions of the systems more adaptive as well as efficient and intelligent.

Referring to FIGS. 9-12, methodologies relating to conducting and/or facilitating channel dependent mobile handover are depicted. While, for purposes of simplicity of explanation, the methodologies are shown and described as a series of acts, it is to be understood and appreciated that the methodologies are not limited by the order of acts. For example, in accordance with one or more aspects, some acts can occur in different orders and/or concurrently with other acts from that shown and described herein. In addition, those skilled in the art will understand and appreciate that a methodology could alternatively be represented as a series of interrelated states or events, such as in a state diagram. Moreover, not all illustrated acts are necessarily required to implement a methodology in accordance with one or more aspects.

Figure 9:
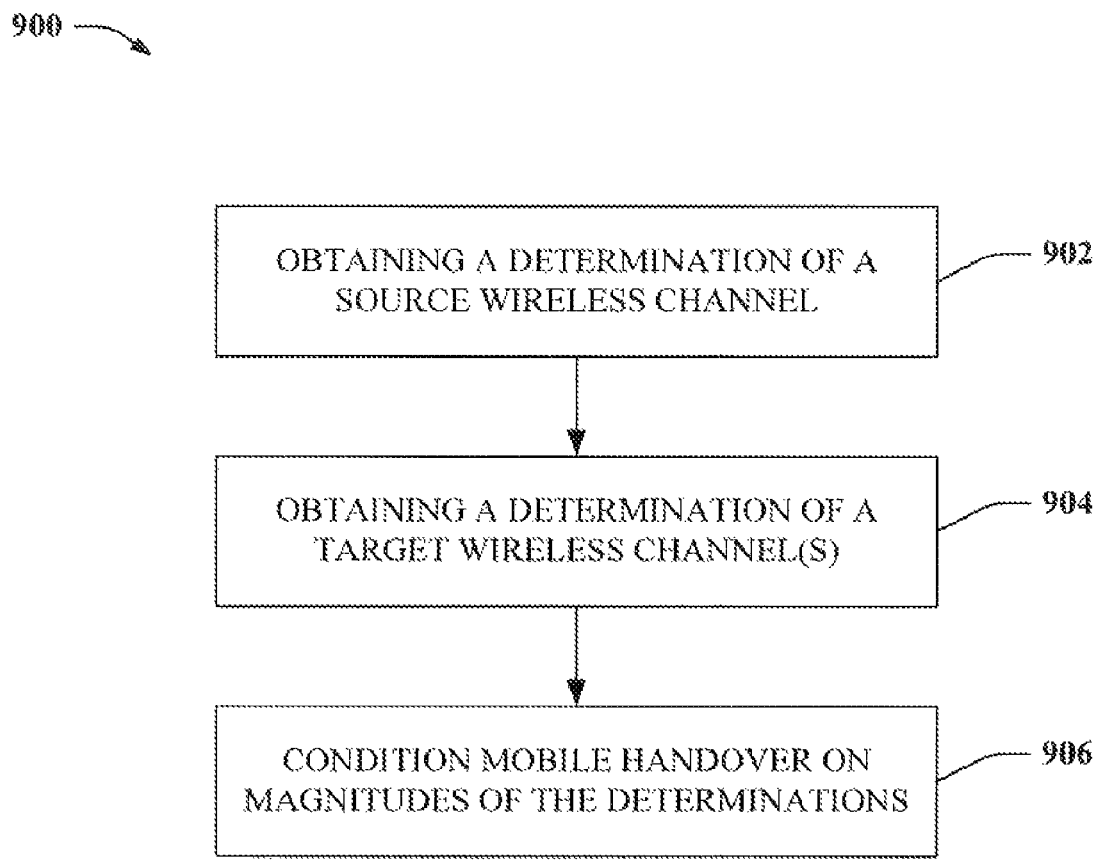
FIG. 9 illustrates an example methodology for providing channel dependent handover according to at least one aspect.

FIG. 9 illustrates an example methodology 900 for providing channel dependent handover according to at least one aspect. At 902, method 900 can obtain a first determination pertaining to a characteristic of a wireless channel. The wireless channel can be, for instance, an active wireless channel communicatively coupling a mobile device with a base station. Accordingly, the wireless channel can provide connectivity and voice and/or data content to the mobile device.

In addition to the foregoing, the determination can be obtained from one or more applications at the mobile device, or one or more applications at the base station. The determination can, for instance, pertain to one or more characteristics of the wireless channel suitable to evaluate reliability of data exchange for the mobile device. Such characteristics can include, but are not limited to, signal quality, signal strength, signal noise, signal interference multi-path scatter, or the like or a combination thereof. In addition, the determination can result in a magnitude of such characteristic(s) of the wireless channel.

At 904, method 900 can obtain a second determination pertaining to characteristics of one or more additional wireless channels. The characteristics of the one or more additional wireless channels can be identical to the characteristic of the wireless channel, above, or can be similar corresponding characteristics. The second determination can result in a magnitude of the characteristics of the one or more additional wireless channels.

At 906, method 900 can implement a handover or initiate a transmission report for a mobile device based at least in part on a difference in the magnitudes of the first determination and the second determination, optionally plus a non-negative offset. As a specific example, the difference in magnitudes can be a number of dB of signal strength, or a like unit of measure of the characteristic(s). The transmission report is initiated by the mobile device and provides at least the difference in magnitudes. The transmission report can further accompany a request for a network-initiated handover. A difference in magnitudes of the first and second determinations can also result in a forward, or active, handover initiated by the mobile device. By incorporating a degree or magnitude of difference in source and target channels, probability of a handover can be weighted as a function of the disparity in channel characteristics. For instance, a handover can be more likely if the target channel provides better transmission characteristics than the source channel.

Conventional handover determinations employ a number of times that target channel provides better connectivity than source channel over a certain number of observation intervals, but ignore disparity in such connectivity. Accordingly, rapid depreciation of source channel connectivity can result in call drop. Method 900, in contrast, can decrease likelihood of the call drop by increasing probability of a handover based on large disparity in source and target channel connectivity. Accordingly, method 900 provides a significant advantage for reliable wireless communications.

Figure 10:
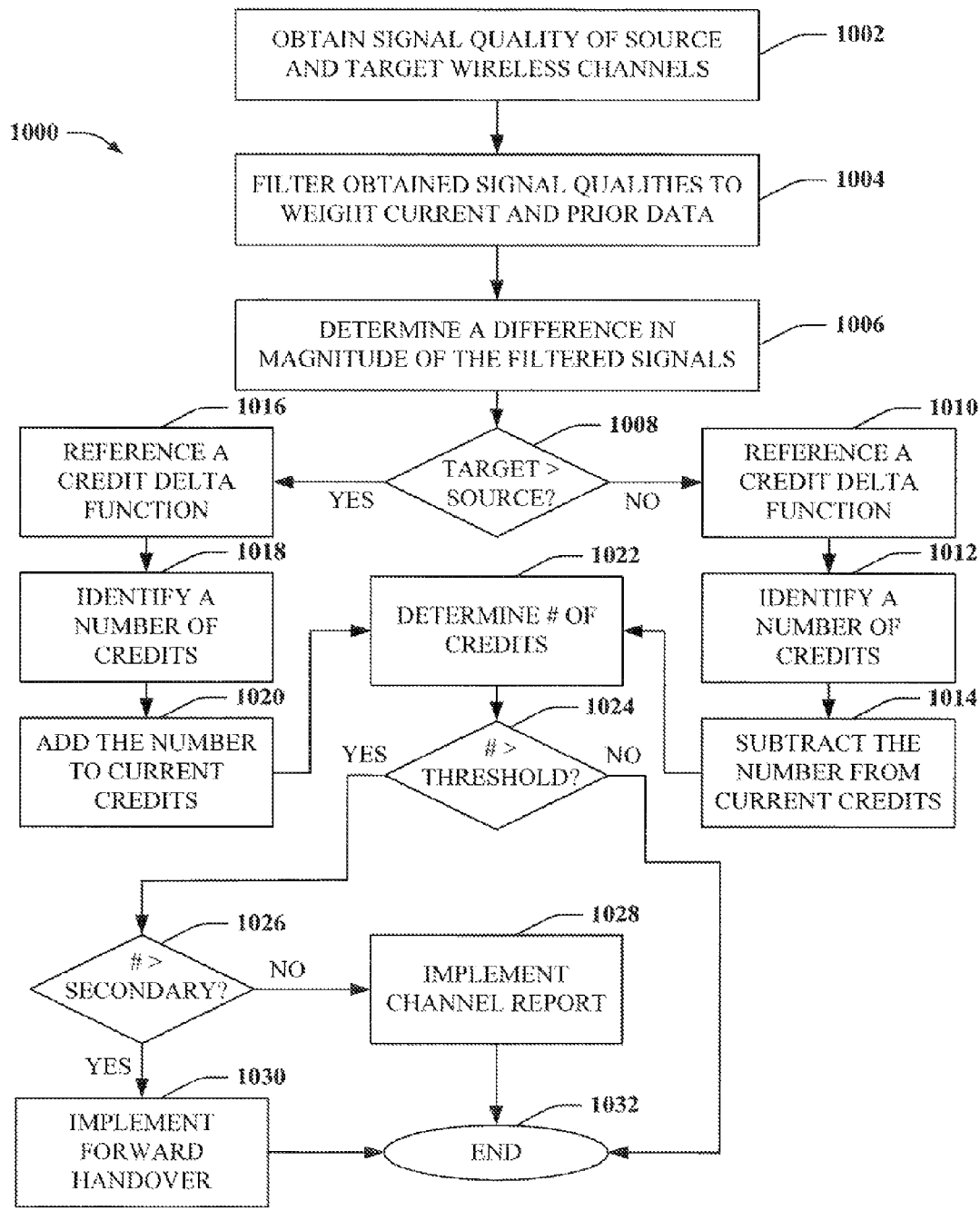
FIG. 10 illustrates an example methodology for providing channel dependent handover according to one or more other aspects.

FIG. 10 illustrates an example methodology 1000 for providing channel dependent handover according to one or more other aspects. At 1002, method 1000 can obtain signal quality of source and target wireless channels. Such signal quality can be obtained from a base station coupled with a particular mobile device, for instance. Alternatively, or in addition, the signal qualities can be obtained at an application on the mobile device.

At 1004, method 1000 can filter obtained signal qualities. In one example, filtering can be implemented to weight current signal quality data with prior signal quality data. According to particular aspects, filtering can be implemented with a 1-tap IIR filter, a FIR filter, or the like, as described herein and/or known in the art.

At 1006, method 1000 can determine a difference in magnitudes of the filtered signals strengths. At 1008, a determination can be made as to whether the magnitude of the target signal is greater than a magnitude of the source signal, optionally in addition to a differential factor (e.g., a minimum differential between source and target signal magnitudes). Thus, if the magnitude of the target signal is greater than the magnitude of the source signal, a disparity, or adjusted difference in magnitude, in source and target signal can be determined based on the following equation:

$$\Delta_1 = T_{CH} - (S_{CH} + DIFF)$$

where $\Delta_1$ is the channel disparity when the target channel(s) is stronger or otherwise preferable to the source channel $T_{CH}$ is the target channel(s) evaluation magnitude, $S_{CH}$ is the source channel evaluation magnitude, and DIFF is a minimum offset value (e.g., substantially 1 dB to 3 dB). If the magnitude of the source signal is greater than the magnitude of the target signal, a disparity/net difference in magnitude in source and target signal can be determined based on the following equation:

$$\Delta_2 = S_{CH} - (T_{CH} + DIFF)$$

where $\Delta_2$ is the channel disparity when the source channel is stronger or otherwise preferable to the target channel(s). If magnitude of (filtered) target channel signal strength is greater than the magnitude of the (filtered) source channel signal strength, method 1000 can proceed to 1016. Otherwise, method 1000 can proceed to 1010.

At 1010, method 1000 can reference a credit delta function based on the determined difference in target and source signals. Such a function can identify a number of handover credits to be accorded to the target signal based on the determined difference. According to at least one aspect, the function can have the following form:

n=0 for $\Delta$<2 dB n=1 for 2 dB$\leq\Delta\leq$4 dB, n=2 for 4 dB$\leq\Delta\leq$6 dB n=3 for 6 dB$\leq\Delta$<8 dB; and n=4 for 8 dB$\leq\Delta$, where n is a number of handover credits and $\Delta$ is the difference in magnitude.

At 1012, the number of credits can be identified from the function based on the difference in signal magnitudes, as discussed above. At 1014, the number of credits is subtracted from a current number of credits associated with the target channel. In some aspects, the current number of credits can have a bottom limit of zero (e.g., cannot drop below zero despite disparity in target and source channel signal strength).

At 1016, a credit delta function can be referenced based on the determined difference in target and source signals if the target signal magnitude is greater than (or, in some aspects, equal to) the source signal magnitude. At 1018, a number of credits can be determined from the credit delta function, as described above. At 1020, the number of credits can be added to the current number of credits associated with the target channel.

At 1022, method 1000 can determine the number of credits associated with the target channel. At 1024, a determination is made as to whether the number of credits is greater than (or, in some aspects, equal to) a threshold. If so, method 1000 can proceed to 1026. Otherwise, method 1000 proceeds to 1032 and terminates.

At 1026, method 1000 can determine whether the number of credits is greater than a secondary threshold. If not, a transmission report (optionally requesting a backward handover) is initiated at 1028, as described herein, and method 1000 proceeds to 1032 and terminates. If the number of credits is greater than the secondary threshold, method 1000 proceeds to 1030 where a forward handover is implemented, and then proceeds to 1032 and terminates. As described, method 1000 provides a mobile handover determination based at least in part on a difference in magnitude of target channel signal strength as compared with source channel signal strength. Further, the handover determination can be based oil multiple such signal strength comparisons, where each comparison adds or subtracts (or, in some aspects, neither adds or subtracts) a; number of credits to a target channel credit pool based on the comparison of source and target signal strength and difference of such comparison. Accordingly, rapid degradation of a source channel can increase likelihood of a mobile handover, and reduce likelihood of a call drop in some instances. Accordingly, method 1000 provides further reliability for wireless communications.

Figure 11:
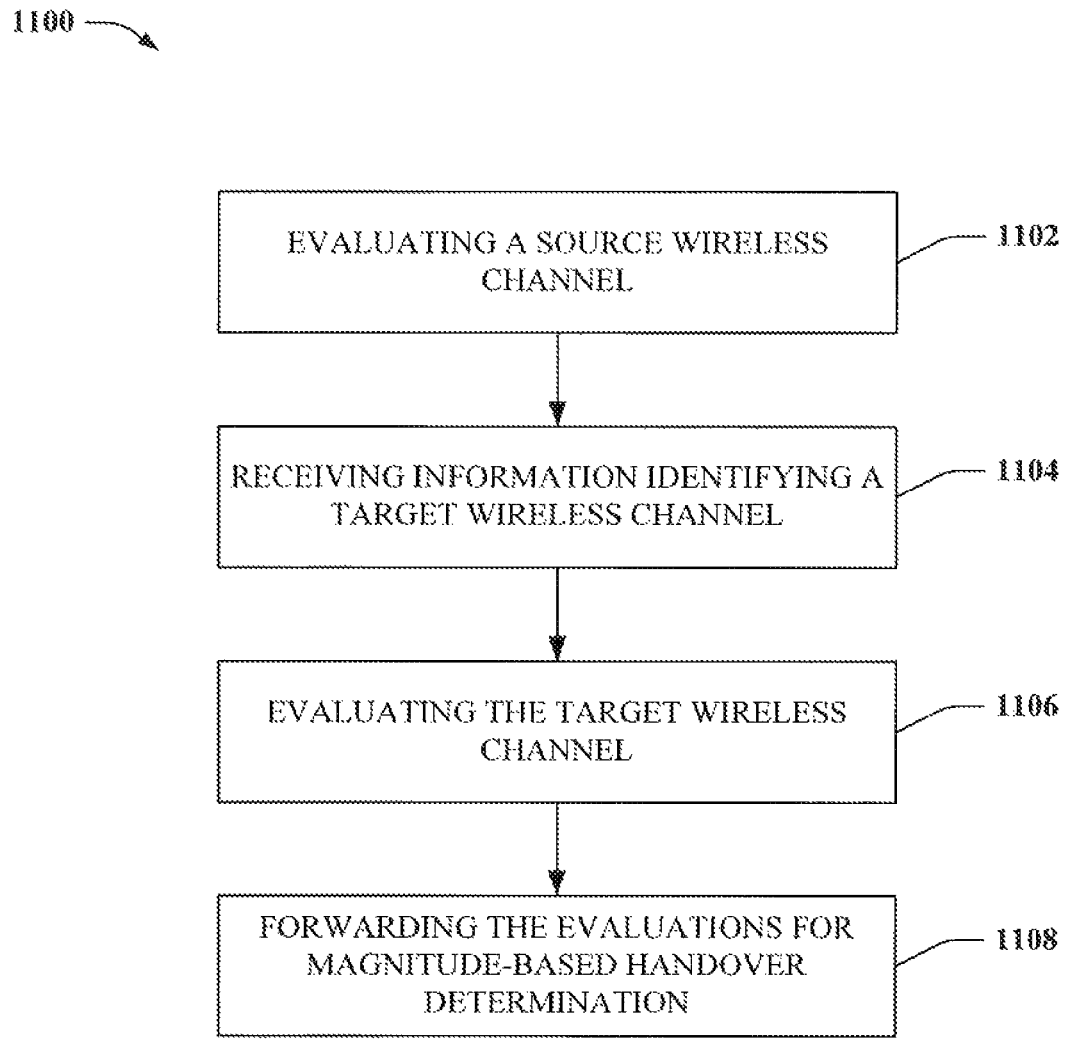
FIG. 11 depicts an example methodology for facilitating channel dependent handover according to one or more aspects.

FIG. 11 depicts an example methodology 1100 for facilitating channel dependent handover according to one or more aspects. At 1102, method 1100 can conduct a first evaluation pertaining to a characteristic of a wireless channel. As described herein, the wireless channel can comprise an active wireless channel that provides exchange of voice and/or data content between a mobile device and a wireless transmitter. Also as described herein, the characteristic can pertain to a signal quality, signal strength, signal noise, signal interference, multi-patch scatter, or the like or a combination thereof, associated with the wireless channel.

At 1104, method 1100 can receive information that identifies at least one additional wireless channel communicatively coupled with the mobile device. The additional wireless channel can be a target channel that provides passive communication for the mobile device. For instance, system data, such as target channel transmission characteristics, can be conveyed via the passive communication, but typically application content (e.g., voice call data, media application data such as streaming audio or streaming video, web-browsing data, and so on) is not exchange over such a connection.

At 1106, method 1100 can conduct a second evaluation pertaining to the characteristic of the at least one additional wireless channel (communicatively coupled with the mobile device). In some aspects, the characteristic of the at least on additional channel is identical to, or is a corresponding characteristics of, the characteristic of the wireless channel. At 1108, the first and second evaluations can be forwarded to the mobile device. The evaluations can facilitate implementing a handover based at least in part on a different in magnitude of the first and second evaluations, as described herein. Accordingly, method 1100 provides for assisting a mobile device in determining channel characteristics of active and target wireless channels to implement the handover.

Figure 12:
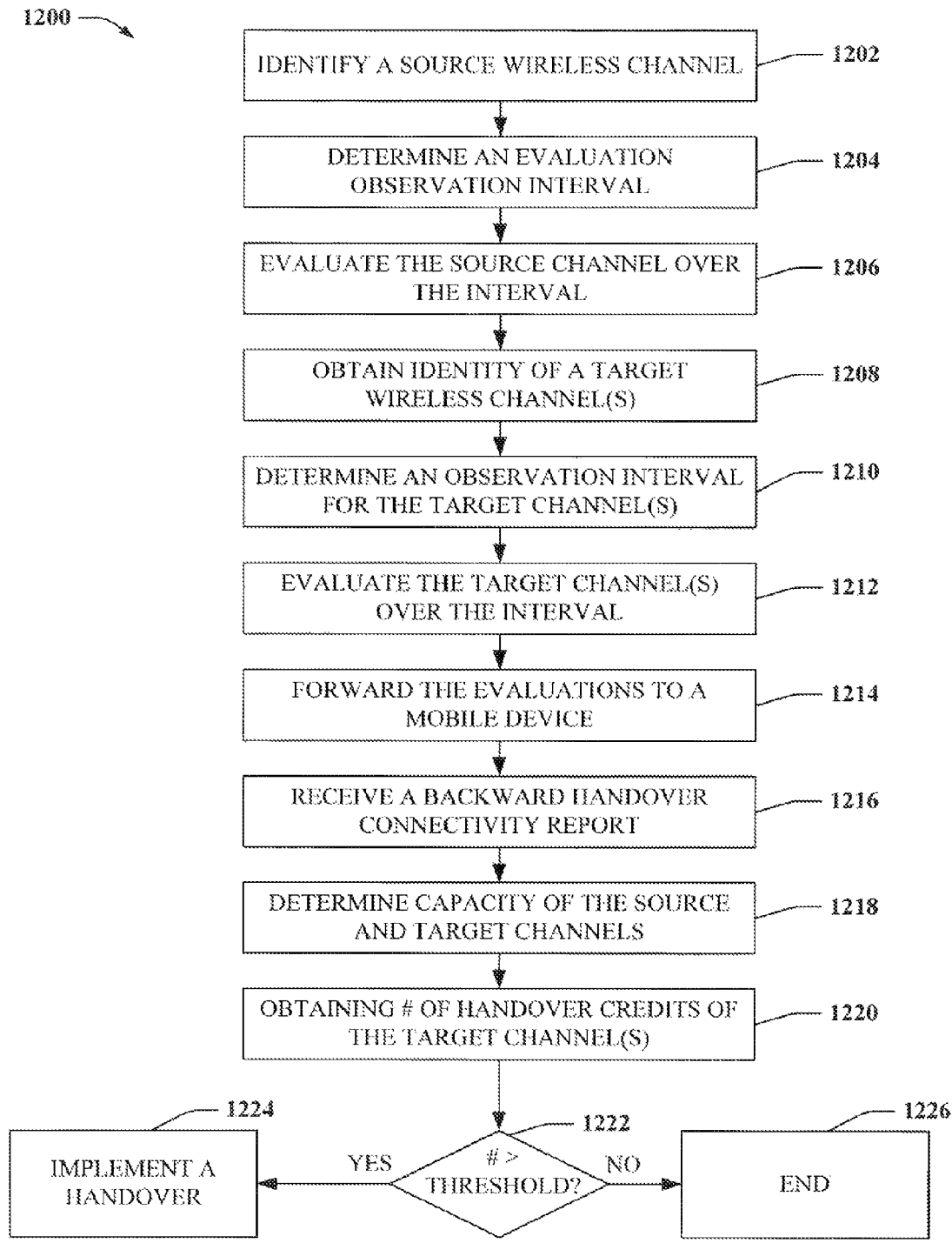
FIG. 12 illustrates a sample methodology for facilitating channel dependent handover according to at least one additional aspect.

FIG. 12 illustrates a sample methodology 1200 for facilitating channel dependent handover according to at least one additional aspect. At 1202, method 1200 can identify a source wireless channel coupled to and/or providing wireless content for a mobile device. At 1204, an evaluation observation interval suitable to measure a characteristic of the source wireless channel can be determined. In some aspects, an observation interval of 0.5 milliseconds can be employed. At 1206, the source channel is evaluated over the observation interval.

At 1208, method 1200 can obtain indicia identifying a target wireless channel(s). At 1210, an observation interval suitable to measure the characteristic of the target wireless channel(s) can be determined. In some aspects, an observation interval having a same duration as that employed to evaluate the source wireless channel can be employed. In further aspects, duration of 0.5 milliseconds can be employed for the observation interval associated with the target wireless channel(s). According to still other aspects, a common observation interval (e.g., of 0.5 millisecond duration) can be utilized to measure both the wireless channel and the target wireless channel(s). At 1212, method 1200 can evaluate the target wireless channel(s) over the observation interval determined at reference number 1210.

At 1214, method 1200 can forward results of the evaluations of the source and target channels to a mobile device. At 1216, a channel transmission report, optionally including a request for a backward handover, can be received. The transmission report can comprise channel connectivity information. In some aspects, such a report can indicate contemporaneous difference in magnitude of evaluated source and target wireless channels. As a particular example, the report could indicate that a target wireless channel has a signal strength that is a certain number of dB higher than the source wireless channel. Alternatively, or in addition, the report could indicate a number of handover credits accumulated to the target wireless channel based on the difference in magnitude of the evaluated channels, and/or based on differences in magnitude of prior channel evaluations.

At 1218, method 1200 can determine capacity of the source and target channels. Capacity can include, for instance, a number of mobile devices utilizing resources of such channels and/or a number of available resources of such channels. At 1220, method 1200 can obtain a number of handover credits associated with the target channel(s) from the mobile device (e.g., included within die report and/or requested from the base station). At 1222, a determination can be made as to whether the number of credits equals or exceeds a handover threshold. If so, method 1200 can proceed to 1224 where the handover from the source wireless channel to at least one target wireless channel is implemented. If not, method 1200 can proceed to 1226 and terminate.

Figure 13:
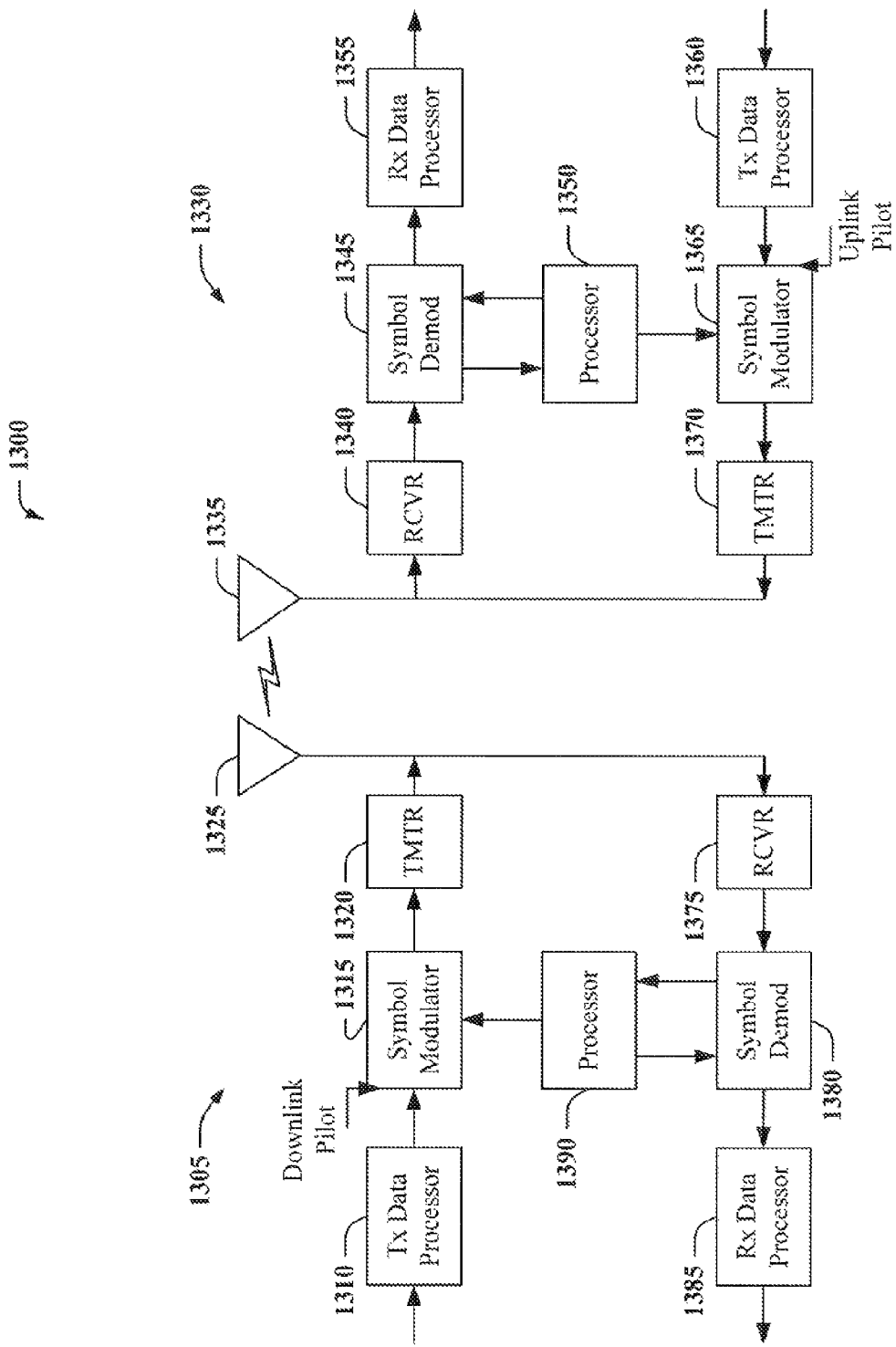
FIG. 13 depicts a block diagram of an example system that can facilitate remote communication according to some aspects disclosed herein.

FIG. 13 depicts a block diagram of an example system 1300 that can facilitate wireless communication according to some aspects disclosed herein. On a downlink, at access point 1305, a transmit (TX) data processor 1310 receives, formats, codes, interleaves, and modulates (or symbol maps) traffic data and provides modulation symbols ("data symbols"). A symbol modulator 1315 receives and processes the data symbols and pilot symbols and provides a stream of symbols. A symbol modulator 1320 multiplexes data and pilot symbols and provides them to a transmitter unit (TMTR) 1320. Each transmit symbol can be a data symbol, a pilot symbol, or a signal value of zero. The pilot symbols can be sent continuously in each symbol period. The pilot symbols can be frequency division multiplexed (FDM), orthogonal frequency division multiplexed (OFDM), time division multiplexed (TDM), time division multiplexed (TDM), or code division multiplexed (CDM).

TMTR 1320 receives and converts the stream of symbols into one or more analog signals and further conditions (e.g., amplifies, filters, and frequency upconverts) the analog signals to generate a downlink signal suitable for transmission over the wireless channel. The downlink signal is then transmitted through an antenna 1325 to the terminals. At terminal 1330, an antenna 1335 receives the downlink signal and provides a received signal to a receiver unit (RCVR) 1340. Receiver unit 1340 conditions (e.g., filters, amplifies, and frequency downconverts) the received signal and digitizes the conditioned signal to obtain samples. A symbol demodulator 1345 demodulates and provides received pilot symbols to a processor 1350 for channel estimation. Symbol demodulator 1345 further receives a frequency response estimate for the downlink from processor 1350, performs data demodulation on the received data symbols to obtain data symbol estimates (which are estimates of the transmitted data symbols), and provides the data symbol estimates to an RX data processor 1355, which demodulates (i.e., symbol demaps), deinterleaves, and decodes the data symbol estimates to recover the transmitted traffic data. The processing by symbol demodulator 1345 and RX data processor 1355 is complementary to the processing by symbol modulator 1315 and TX data processor 1310, respectively, at access point 1305.

On the uplink, a TX data processor 1360 processes traffic data and provides data symbols. A symbol modulator 1365 receives and multiplexes the data symbols with pilot symbols, performs modulation, and provides a stream of symbols. A transmitter unit 1370 then receives and processes the stream of symbols to generate an uplink signal, which is transmitted by the antenna 1335 to the access point 1305. Specifically, the uplink signal can be in accordance with SC-FDMA requirements and can include frequency hopping mechanisms as described herein.

At access point 1305, the uplink-signal from terminal 1330 is received by the antenna 1325 and processed by a receiver unit 1375 to obtain samples. A symbol demodulator 1380 then processes the samples and provides received pilot symbols and data symbol estimates for the uplink. An RX data processor 1385 processes the data symbol estimates to recover the traffic data transmitted by terminal 1330. A processor 1390 performs channel estimation for each active terminal transmitting on the uplink. Multiple terminals can transmit pilot concurrently on the uplink on their respective assigned-sets of pilot subbands, where the pilot subband sets can be interlaced.

Processors 1390 and 1350 direct (e.g., control, coordinate, manage, etc.) operation at access point 1305 and terminal 1330, respectively. Respective processors 1390 and 1350 can be associated with memory units (not shown) that store program codes and data. Processors 1390 and 1350 can also perform computations to derive frequency and impulse response estimates for the uplink and downlink, respectively.

For a multiple-access system (e.g., SC-FDMA, FDMA, OFDMA, CDMA, TDMA, etc.), multiple terminals can transmit concurrently on the uplink. For such a system, the pilot subbands can be shared among different terminals. The channel estimation techniques can be used in cases where the pilot subbands for each terminal span the entire operating band (possibly except for the band edges). Such a pilot subband structure would be desirable to obtain frequency diversity for each terminal. The techniques described herein can be implemented by various means. For example, these techniques can be implemented in hardware, software, or a combination thereof. For a hardware implementation, which can be digital, analog, or both digital and analog, the processing units used for channel estimation can be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof. With software, implementation can be through modules (e.g., procedures, functions, and so on) that perform the functions described herein. The software codes can be stored in memory unit and executed by the processors 1390 and 1350.

It is to be understood that the embodiments described herein can be implemented in hardware, software, firmware, middleware, microcode, or any suitable combination thereof. For a hardware implementation, the processing units can be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof.

When the embodiments are implemented in software, firmware, middleware or microcode, program code or code segments, they can be stored in a machine-readable medium, such as a storage component. A code segment can represent a procedure, a function, a subprogram a program, a routine, a subroutine, a module, a software package, a class, or any combination of instructions, data structures, or program statements. A code segment can be coupled to another code segment or a hardware circuit by passing and/or receiving information, data, arguments, parameters, or memory contents. Information, arguments, parameters, data, etc. can be passed, forwarded, or transmitted using any suitable means including memory sharing, message passing, token passing, network transmission, etc.

For a software implementation, the techniques described herein can be implemented with modules (e.g., procedures, functions, and so on) that perform the functions described herein. The software codes can be stored in memory units and executed by processors. The memory unit can be implemented within the processor or external to the processor, in which case it can be communicatively coupled to the processor via various means as is known in the art.

Figure 14:
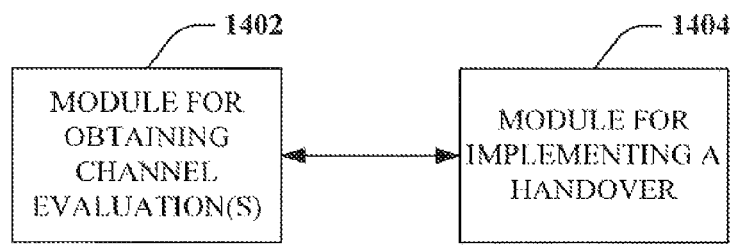
FIGS. 14 and 15 depict block diagrams of systems that can conduct or facilitate, respectively, channel dependent handover in a wireless environment.
Figure 15:
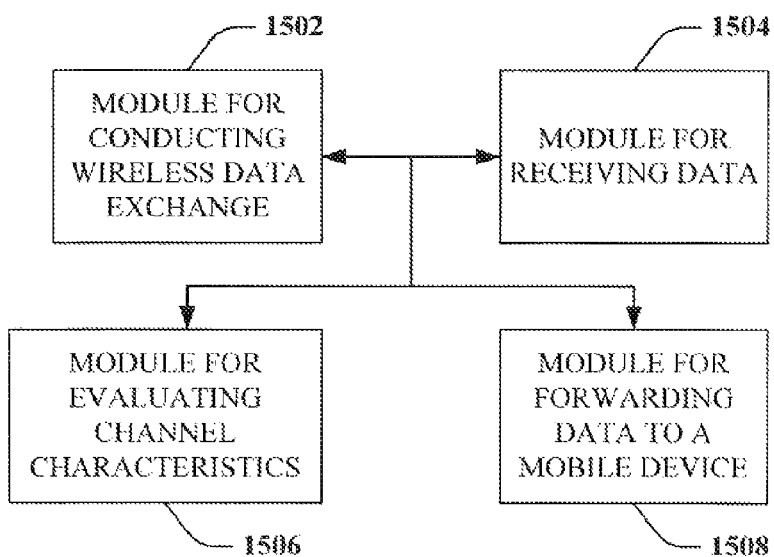

FIGS. 14 and 15 depict block diagrams of systems 1400 and 1500 that can conduct or facilitate, respectively, channel dependent handover in a wireless environment. System 1400 can include a module 1402 for obtaining channel characteristic evaluations. In some aspects, module 1402 can obtain a first determination pertaining to a characteristic of a wireless channel (e.g., an active channel that facilitates data exchange between the mobile device and at least one transmitter). Further, the module 1402 can obtain a second determination pertaining to the characteristic of one or more additional wireless channels. The characteristic can be any suitable indicator of wireless reliability or quality, such as signal strength, signal quality, signal noise or interference, multi-path scatter, and so on.

System 1400 can further include a module 1404 for implementing a handover. The module 1404 can conduct the handover for the above-mentioned mobile device based at least in part on a difference in magnitude between the first determination (e.g., pertaining to the wireless channel) and the second determination (e.g., pertaining to the one or more additional wireless channels). In some aspects, the handover can be further based on a number of handover credits associated with the one or more additional wireless channels. The handover credits are based on the difference in magnitude of the first determination and the second deterioration and/or differences in magnitudes of similar, previous such determinations.

Accordingly, a degree of disparity in signal quality can be utilized by system 1400 to increase likelihood of a mobile handover.

System 1500 can comprise a module 1502 for conducting wireless data exchange with a mobile device by way of a wireless channel (e.g., an active channel). System 1500 can further comprise a module 1504 for receiving information that identifies at least one additional wireless channel (e.g., passive channel) communicatively coupled with the mobile device. For instance, the module 1504 can utilized an antenna and receiver to obtain the information from the mobile device. In addition to the foregoing, system 1500 can comprise a module 1506 for conducting a first evaluation pertaining to a characteristic of the wireless channel and conducting or receiving a second evaluation pertaining to the characteristic of the at least one additional wireless channel. The characteristic can comprise, for instance, signal strength measured in dB. Moreover, system 1500 can further comprise a module 1508 for forwarding at least the first and second evaluations, and/or results thereof, to the mobile device. By forwarding the evaluations/results, module 1508 can facilitate implementing a handover based at least in part on a difference in magnitude of the first and second evaluations. For instance, if the difference in magnitude indicates a disparity of 10 dB between the wireless channel and the one or more additional wireless channels, the 10 dB difference in magnitude can be utilized by the mobile device to initiate a transmission report, request a handover (e.g., backward handover), or conduct a handover, (e.g., a forward handover). Accordingly, systems 1400 and 1500 can utilize channel-dependent information to base handover determinations in a mobile operating environment, providing more robust mobile communication in at least some aspects.

What has been described above includes examples of one or more aspects. It is, of course, not possible to describe every conceivable combination of components or methodologies for purposes of describing the aforementioned aspects, but one of ordinary skill in the art may recognize that many further combinations and permutations of various aspects are possible. Accordingly, the described aspects are intended to embrace all such alterations, modifications and variations that fall within the scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A method of conducting a mobile device handover in a wireless communication environment, comprising:
    obtaining a first determination pertaining to a characteristic of a wireless channel, the wireless channel provides connectivity for a mobile device;
    obtaining a second determination pertaining to the characteristic of one or more additional wireless channels;
    updating a number of handover credits of at least one of the one or more additional wireless channels based on a function of a difference in magnitude between the first determination and the second determination; and
    triggering a channel report or implementing a handover for the mobile device based at least in part on the updated number of handover credits.

2. The method of claim 1, further comprising increasing the number of handover credits if the magnitude of the second determination is greater than the magnitude of the first determination plus an offset, wherein the offset is zero or greater.

3. The method of claim 1, further comprising decreasing the number of handover credits if the magnitude of the first determination is greater than the magnitude of the second determination plus an offset, wherein the offset is zero or greater.

4. The method of claim 1, further comprising employing a function of the following form as the function of the difference in magnitude:

$$n=0 \text{ for } \Delta<2 \text{ dB}$$

$$n=1 \text{ for } 2 \text{ dB} \leq \Delta \leq 4 \text{ dB},$$

$$n=2 \text{ for } 4 \text{ dB} \leq \Delta \leq 6 \text{ dB}$$

$$n=3 \text{ for } 6 \text{ dB} \leq \Delta < 8 \text{ dB; and}$$

$$n=4 \text{ for } 8 \text{ dB} \leq \Delta,$$

where n is a number of handover credits and $\Delta$ is the difference in magnitude.

5. The method of claim 1, further comprising triggering the channel report if the updated number of handover credits exceeds a primary credit threshold.

6. The method of claim 1, further comprising implementing a forward handover if the updated number of handover credits exceeds a secondary credit threshold.

7. The method of claim 1, further comprising resetting the number of handover credits to zero if a handover is implemented.

8. The method of claim 1, further comprising filtering the first determination or the second determination by employing a channel filtering function.

9. The method of claim 8, further comprising applying the filtering of the first determination or the second determination prior to evaluating the difference in magnitude.

10. The method of claim 8, further comprising employing a 1-tap Infinite Impulse Response (IIR) filter or Finite Impulse Response (FIR) filter as the channel filtering function.

11. An apparatus that conducts a handover for a mobile device in a wireless environment, comprising:
    a transceiver that communicatively couples the mobile device to at least one wireless transmitter via a wireless channel;
    memory that stores at least one program module pertinent to facilitating a handover for the mobile device;
    a processor that executes one or more program modules stored in memory;
    a channel evaluation module that obtains a first determination pertaining to a characteristic of the wireless channel and a second determination pertaining to the characteristic of one or more additional wireless channels; and
    a handover evaluation module that triggers a channel report or implements a handover for the mobile device based at least in part on a difference in magnitude between the first determination and the second determination.

12. The apparatus of claim 11, a handover management module that updates a number of handover credits of at least one of the one or more additional wireless channels based on a function of the difference in magnitude.

13. The apparatus of claim 12, wherein the handover management module increases the number of handover credits if the magnitude of the second determination is greater than the magnitude of the first determination plus an offset, wherein the offset is zero or greater.

14. The apparatus of claim 12, wherein the handover management module decreases the number of handover credits if the magnitude of the first determination is greater than the magnitude of the second determination plus an offset, wherein the offset is zero or greater.

15. The apparatus of claim 12, further comprising a calculation module that employs a function of the following form as the function of the difference in magnitude:

$$n=0 \text{ for } \Delta<2 \text{ dB}$$

$$n=1 \text{ for } 2 \text{ dB} \leq \Delta \leq 4 \text{ dB},$$

$$n=2 \text{ for } 4 \text{ dB} \leq \Delta \leq 6 \text{ dB}$$

$$n=3 \text{ for } 6 \text{ dB} \leq \Delta < 8 \text{ dB; and}$$

$$n=4 \text{ for } 8 \text{ dB} \leq \Delta,$$

where n is a number of handover credits and $\Delta$ is the difference in magnitude.

16. The apparatus of claim 12, further comprising an output module that triggers a measurement report if the updated number of handover credits exceeds a primary credit threshold.

17. The apparatus of claim 12, further comprising an execution module that implements a forward handover if the updated number of handover credits exceeds a secondary credit threshold.

18. The apparatus of claim 12, wherein the handover management module updates the number of handover credits to zero if a handover is implemented.

19. The apparatus of claim 1, further comprising a normalization module that filters the first determination or the second determination by employing a channel filtering function.

20. The apparatus of claim 19, wherein the normalization module filters the first determination or the second determination prior to the difference in magnitude being evaluated.

21. The apparatus of claim 19, wherein the normalization module employs a 1-tap IIR filter or FIR filter as the channel filtering function.

22. An apparatus that conducts a handover for a mobile device in a wireless environment, comprising:
    means for obtaining a first determination pertaining to a characteristic of the wireless channel and a second determination pertaining to the characteristic of one or more additional wireless channels, the wireless channel facilitates data exchange between the mobile device and at least one transmitter;
    means for updating a number of handover credits of at least one of the one or more additional wireless channels based on a function of a difference in magnitude between the first determination and the second determination; and
    means for triggering a channel report or implementing a handover for the mobile device based at least in part on the updated number of handover credits.

23. A processor that conducts a handover for a mobile device in a wireless environment, comprising:
    a first module configured to obtain a first determination pertaining to a characteristic of a wireless channel and a second determination pertaining to the characteristic of one or more additional wireless channels, the wireless channel facilitates data exchange between the mobile device and at least one transmitter;
    an update module configure to update a number of handover credits of at least one of the one or more additional wireless channels based on a function of a difference in magnitude between the first determination and the second determination; and a second module configured to trigger a channel report or implement a handover for the mobile device based at least in part on the updated number of handover credits.

24. A non-transitory computer-readable medium, comprising:
computer-readable instructions configured to conduct a handover for a mobile device in a wireless environment, the instructions are executable by at least one computer to:
obtain a first determination pertaining to a characteristic of a wireless channel, the wireless channel facilitates data exchange between the mobile device and at least one transmitter;
obtain a second determination pertaining to the characteristic of one or more additional wireless channels; and
trigger a channel report or implement a handover for the mobile device based at least in part on a difference in magnitude between the first determination and the second determination.

25. A method of facilitating a handover for a mobile device in a wireless environment, comprising:
conducting a first evaluation pertaining to a characteristic of a wireless channel, the wireless channel provides data exchange between a mobile device and a wireless transmitter;
receiving information that identifies at least one additional wireless channel communicatively coupled with the mobile device;
conducting or receiving a second evaluation pertaining to the characteristic of the at least one additional wireless channel; and
forwarding at least the first and second evaluations to the mobile device to facilitate implementing a handover based at least in part on a difference in magnitude of the first and second evaluations.

26. The method of claim 25, further comprising employing downlink signal quality of the wireless channel as the characteristic of the wireless channel.

27. The method of claim 25, further comprising employing downlink signal quality of the at least one additional wireless channel as the characteristic of the at least one additional wireless channel.

28. The method of claim 25, further comprising employing an observation interval having a common length of time for the first determination and the second determination.

29. The method of claim 28, further comprising employing substantially 0.5 milliseconds as the common length of time.

30. The method of claim 25, further comprising employing a common period of time to conduct the first evaluation and the second evaluation.

31. The method of claim 30, further comprising employing 0.5 milliseconds as a duration for the common period of time.

32. The method of claim 25, further comprising receiving from the mobile device a connectivity report associated with the wireless channel or the at least one additional wireless channel.

33. The method of claim 32, further comprising determining capacity of the at least one additional wireless channel and capacity of the wireless channel.

34. The method of claim 33, further comprising implementing a handover for the mobile device from the wireless channel to the at least one additional wireless channel based at least in part on the determined capacities or the difference in magnitude.

35. The method of claim 32, further comprising extracting a number of handover credits associated with the at least one additional wireless channel and implementing a handover for the mobile device if the number of handover credits exceeds a handover threshold.

36. An apparatus that facilitates a handover for a mobile device in a wireless environment, comprising:
a wireless transceiver that communicatively couples to the mobile device by way of a wireless channel;
memory that stores one or more modules pertinent to implementing the handover;
a processor that executes the one or more modules in conjunction with implementing the handover;
an evaluation module that conducts a first determination pertaining to a characteristic of the wireless channel and conducts or receives a second determination pertaining to the characteristic of at least one additional wireless channel to facilitate implementing a handover based at least in part on a difference in magnitude of the first and second determinations.

37. The apparatus of claim 36, wherein the evaluation module employs downlink signal quality of the wireless channel as the characteristic of the wireless channel.

38. The apparatus of claim 36, wherein the evaluation module employs downlink signal quality of the at least one additional wireless channel as the characteristic of the at least one additional wireless channel.

39. The apparatus of claim 36, further comprising a timing module that employs an observation interval having a common length of time for the first determination and the second determination.

40. The apparatus of claim 39, wherein the timing module employs substantially 0.5 milliseconds as the common length of time.

41. The apparatus of claim 36, wherein the timing module employs a common period of time to conduct the first evaluation and the second evaluation.

42. The apparatus of claim 41, wherein the timing module employs 0.5 milliseconds as a duration for the common period of time.

43. The apparatus of claim 36, further comprising a channel connectivity module that receives from the mobile device a connectivity report associated with the wireless channel or the at least one additional wireless channel.

44. The apparatus of claim 43, further comprising a loading module that determines capacity of the at least one additional wireless channel and capacity of the wireless channel.

45. The apparatus of claim 36, further comprising a base station transfer module that implements a handover for the mobile device from the wireless channel to the at least one additional wireless channel based at least in part on the determined capacities or the difference in magnitude.

46. The apparatus of claim 43, wherein the channel connectivity module extracts a number of handover credits associated with the at least one additional wireless channel and wherein a base station transfer module implements a handover for the mobile device if the number of handover credits exceeds a handover threshold.

47. An apparatus that conducts a handover for a mobile device in a wireless environment, comprising:
means for conducting wireless data exchange with a mobile device by way of a wireless channel;
means for receiving information that identifies at least one additional wireless channel communicatively coupled with the mobile device;
means for conducting a first evaluation pertaining to a characteristic of the wireless channel and conducting or receiving a second evaluation pertaining to the characteristic of the at least one additional wireless channel; and means for forwarding at least the first and second evaluations to the mobile device to facilitate implementing a handover based at least in part on a difference in magnitude of the first and second evaluations.

48. A processor that conducts a handover for a mobile device in a wireless environment, comprising:
- a first module configured to conduct wireless data exchange with a mobile device by way of a wireless channel;
- a second module configured to receive information that identifies at least one additional wireless channel communicatively coupled with the mobile device;
- a third module configured to conduct a first evaluation pertaining to a characteristic of the wireless channel and conduct or receive a second evaluation pertaining to the characteristic of the at least one additional wireless channel; and
- a fourth module configured to forward at least the first and second evaluations to the mobile device to facilitate implementing a handover based at least in part on a difference in magnitude of the first and second evaluations.

49. A non-transitory computer-readable medium, comprising:
- computer-readable instructions configured to facilitate a handover for a mobile device in a wireless environment, the instructions are executable by at least one computer to:
  - conduct a first evaluation pertaining to a characteristic of a wireless channel, the wireless channel provides data exchange between a mobile device and a wireless transmitter;
  - receive information that identifies at least one additional wireless channel communicatively coupled with the mobile device;
  - conduct or receive a second evaluation pertaining to the characteristic of the at least one additional wireless channel; and
  - forward at least the first and second evaluations to the mobile device to facilitate implementing a handover based at least in part on a difference in magnitude of the first and second evaluations.

* * * * *